(12) United States Patent
Hayashi et al.

(10) Patent No.: US 9,005,078 B2
(45) Date of Patent: Apr. 14, 2015

(54) DRIVE CONTROL DEVICE FOR HYBRID VEHICLE

(75) Inventors: Koji Hayashi, Aichi-gun (JP); Masato Terashima, Toyota (JP); Hiroyasu Harada, Toyota (JP); Tomohito Ono, Gotenba (JP); Hiroyuki Ishii, Nisshin (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/365,476

(22) PCT Filed: Dec. 16, 2011

(86) PCT No.: PCT/JP2011/079249
§ 371 (c)(1),
(2), (4) Date: Jun. 13, 2014

(87) PCT Pub. No.: WO2013/088578
PCT Pub. Date: Jun. 20, 2013

(65) Prior Publication Data
US 2015/0005125 A1    Jan. 1, 2015

(51) Int. Cl.
*B60W 10/08* (2006.01)
*B60K 6/365* (2007.10)
*B60W 20/00* (2006.01)
*B60K 6/445* (2007.10)
*B60W 10/105* (2012.01)
*B60W 10/10* (2012.01)
*F16H 61/21* (2006.01)

(52) U.S. Cl.
CPC ............ *B60K 6/365* (2013.01); *B60W 20/1084* (2013.01); *B60K 6/445* (2013.01); *B60W 10/105* (2013.01); *B60W 20/20* (2013.01); *Y02T 10/6239* (2013.01); *B60W 10/10* (2013.01); *B60W 20/00* (2013.01); *F16H 61/21* (2013.01); *F16H 2312/00* (2013.01); *Y10S 903/915* (2013.01)

(58) Field of Classification Search
None
See application file for complete search history.

(56) References Cited

U.S. PATENT DOCUMENTS

| 8,234,025 B2 * | 7/2012 | Conlon et al. ............... 701/22 |
| 2009/0075779 A1 | 3/2009 | Kumazaki et al. |
| 2013/0006489 A1 | 1/2013 | Kim |
| 2014/0194238 A1 * | 7/2014 | Ono et al. ..................... 475/5 |

FOREIGN PATENT DOCUMENTS

| AU | 2011373822 A1 | 2/2014 |
| JP | 2008-265600 A | 11/2008 |
| JP | 2009-067270 A | 4/2009 |
| JP | 2009-166793 A | 7/2009 |
| WO | 2013/014777 A1 | 1/2013 |

* cited by examiner

*Primary Examiner* — Dirk Wright
(74) *Attorney, Agent, or Firm* — Sughrue Mion, PLLC

(57) ABSTRACT

A drive control device for a hybrid vehicle provided with: a first differential mechanism having a first rotary element connected to a first electric motor, a second rotary element connected to an engine, and a third rotary element connected to an output rotary member; a second differential mechanism having a first rotary element connected to a second electric motor, a second rotary element, and a third rotary element, one of the second rotary element and the third rotary element being connected to the third rotary element of said first differential mechanism; a clutch configured to selectively couple the second rotary element of said first differential mechanism, and the other of the second and third rotary elements of said second differential mechanism which is not connected to the third rotary element of said first differential mechanism, to each other; and a brake configured to selectively couple said other of the second and third rotary elements of said second differential mechanism which is not connected to the third rotary element of said first differential mechanism, to a stationary member, the drive control device comprising: a torque capacity control portion configured to increase torque capacities of both of said clutch and said brake upon lowering of an operating speed of said engine when a control to stop said engine is implemented while the hybrid vehicle is placed in a neutral state.

4 Claims, 10 Drawing Sheets

|  | BK | CL | MODE |
|---|---|---|---|
| EV-1 | ○ |  | 1 |
| EV-2 | ○ | ○ | 2 |
| HV-1 | ○ |  | 3 |
| HV-2 |  | ○ | 4 |
| HV-3 |  |  | 5 |

DRIVE CONTROL DEVICE FOR HYBRID VEHICLE

CROSS REFERENCE TO RELATED APPLICATIONS

This application is a National Stage of International Application No. PCT/JP2011/079249 filed Dec. 16, 2011, the contents of all of which are incorporated herein by reference in their entirety.

TECHNICAL FIELD

The present invention relates to a drive control device for a hybrid vehicle, and more particularly to an improvement for reducing a risk of generation of noises and vibrations upon lowering of an engine speed.

BACKGROUND ART

There is known a hybrid vehicle which has at least one electric motor in addition to an engine such as an internal combustion engine, which functions as a vehicle drive power source. Patent Document 1 discloses an example of such a hybrid vehicle, which is provided with an internal combustion engine, a first electric motor and a second electric motor. This hybrid vehicle is further provided with a brake which is configured to fix an output shaft of the above-described internal combustion engine to a stationary member, and an operating state of which is controlled according to a running condition of the hybrid vehicle, so as to improve energy efficiency of the hybrid vehicle and to permit the hybrid vehicle to run according to a requirement by an operator of the hybrid vehicle.

PRIOR ART DOCUMENT

Patent Document

Patent Document 1: JP-2008-265600 A1

SUMMARY OF THE INVENTION

Object Achieved by the Invention

According to the conventional arrangement of the hybrid vehicle described above, however, the hybrid vehicle is placed in a neutral state when the above-indicated electric motor is brought to a shut-down state. When an operating speed of the engine is lowered in the neutral state, for instance, when an ignition switch is turned off in the neutral state, the engine speed cannot be controlled to be lowered by the electric motor placed in the shut-down state, so that the engine speed is lowered in a free-fall manner according to an inertia, for example. In this case, there arises a problem of generation of noises or vibrations if a first-order explosion frequency of the engine coincides with the resonance frequency of a power transmitting system. This problem was first discovered by the present inventors in the process of intensive studies in an attempt to improve the performance of the hybrid vehicle.

The present invention was made in view of the background art described above. It is therefore an object of the present invention to provide a drive control device for a hybrid vehicle, which permits reduction of a risk of generation of noises and vibrations upon lowering of an engine speed.

Means for Achieving the Object

The object indicated above is achieved according to a first aspect of the present invention, which provides a drive control device for a hybrid vehicle, which is provided with: a first differential mechanism having a first rotary element connected to a first electric motor, a second rotary element connected to an engine, and a third rotary element connected to an output rotary member; a second differential mechanism having a first rotary element connected to a second electric motor, a second rotary element, and a third rotary element, one of the second rotary element and the third rotary element being connected to the third rotary element of the above-described first differential mechanism; a clutch configured to selectively couple the second rotary element of the above-described first differential mechanism, and the other of the second and third rotary elements of the above-described second differential mechanism which is not connected to the third rotary element of the above-described first differential mechanism, to each other; and a brake configured to selectively couple the above-indicated other of the second and third rotary elements of the above-described second differential mechanism which is not connected to the third rotary element of the above-described first differential mechanism, to a stationary member, the control device being characterized in that a torque capacity of at least one of the above-described clutch and the above-described brake is increased upon lowering of an operating speed of the above-described engine.

Advantages of the Invention

According to the first aspect of the invention described above, there are provided: the first differential mechanism having the first rotary element connected to the first electric motor, the second rotary element connected to the engine, and the third rotary element connected to the output rotary member; the second differential mechanism having the first rotary element connected to the second electric motor, the second rotary element, and the third rotary element, one of the second rotary element and the third rotary element being connected to the third rotary element of the above-described first differential mechanism; the clutch configured to selectively couple the second rotary element of the above-described first differential mechanism, and the other of the second and third rotary elements of the above-described second differential mechanism which is not connected to the third rotary element of the above-described first differential mechanism, to each other; and the brake configured to selectively couple the above-indicated other of the second and third rotary elements of the above-described second differential mechanism which is not connected to the third rotary element of the above-described first differential mechanism, to the stationary member. The torque capacity of at least one of the above-described clutch and the above-described brake is increased upon lowering of the operating speed of the above-described engine. The increase of the torque capacity of the clutch and/or the brake upon lowering of the engine speed permits reduction of a length of time required to lower the engine speed to a value corresponding to a lower limit of the resonance band, making it possible to reduce the risk of generation of noises and vibrations upon lowering of the engine speed. Namely, the present invention can provide a drive control device for a hybrid vehicle, which permits reduction of the risk of generation of noises and vibrations upon lowering of the engine speed.

According to a second aspect of the invention, the drive control device according to the above-described first aspect of the invention is configured such that the torque capacity of the at least one of the above-described clutch and the above-described brake is increased when a control to stop the above-described engine is implemented in a neutral state. According to this second aspect of the invention, the increase of the torque capacity of the clutch and/or the brake permits reduction of the length of time required to lower the engine speed to the value corresponding to the lower limit of the resonance band, when the engine is stopped in the neutral state, so that the risk of generation of noises and vibrations can be reduced.

MODE FOR CARRYING OUT THE INVENTION

Figure 1:
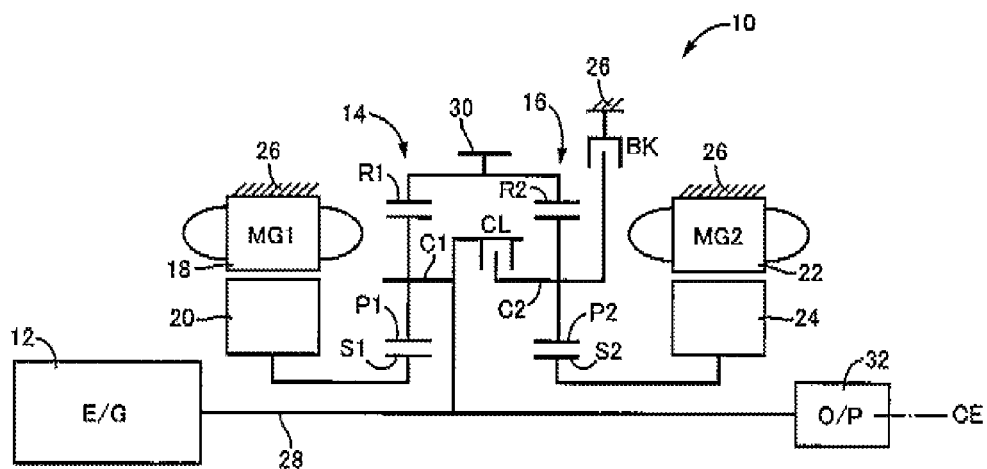
FIG. 1 is a schematic view for explaining an arrangement of a hybrid vehicle drive system to which the present invention is suitably applicable.

In one preferred form of this invention, it is determined that a drive system (power transmitting system) is placed in the neutral state, when a manually operated shifting device is placed in a neutral position "N". Namely, the drive control device of the present invention is suitably applicable to a control to implement a transition of the engine from an operated state to a stop or rest state while the manually operated shifting device is placed in the neutral position "N".

In another preferred form of the invention, a control to lower the operating speed of the engine for stopping the engine is implemented when an ignition switch is operated to an "OFF" state for stopping the engine. More preferably, a command to stop the engine is generated when the ignition switch is operated to the "OFF" state for stopping the engine while the manually operated shifting device is placed in the neutral state.

In a further preferred form of the invention, the control to increase the torque capacity of at least one of the clutch and the brake is implemented upon lowering of the operating speed of the engine, where generation of a resonance in the power transmitting system of the hybrid vehicle is detected or forecasted. In particular, the control to increase the torque capacity of at least one of the clutch and the brake is implemented when it is detected or forecasted that a frequency of vibrations generated due to a rotary motion of the engine while the vehicle is stationary, that is, while the vehicle running speed is zero falls within a predetermined resonance band corresponding to the resonance frequency of the power transmitting system.

In a still further preferred form of the invention, the torque capacity of the clutch is increased, and preferably the clutch is fully engaged, when the operating speed of the engine is lowered as a result of an operation of the ignition switch to the "OFF" state while it is determined that the power transmitting system is placed in a hybrid drive mode (HV-1) which is established by a releasing action of the clutch and an engaging action of the brake and in which the engine is operated as a vehicle drive power source, while the first electric motor and the second electric motor are operated as needed to generate a vehicle driving force or an electric energy.

In a yet further preferred form of the invention, the torque capacity of the brake is increased, and preferably the brake is fully engaged, when the operating speed of the engine is lowered as a result of an operation of the ignition switch to the "OFF" state while it is determined that the power transmitting system is placed in a hybrid drive mode (HV-2) which is established by an engaging action of the clutch and a released action of the brake and in which the engine is operated as a vehicle drive power source, while the first electric motor and the second electric motor are operated as needed to generate a vehicle driving force or an electric energy.

Referring to the drawings, preferred embodiments of the present invention will be described in detail. It is to be understood that the drawings referred to below do not necessarily accurately represent ratios of dimensions of various elements.

FIRST EMBODIMENT

FIG. 1 is the schematic view for explaining an arrangement of a hybrid vehicle drive system 10 (hereinafter referred to simply as a "drive system 10") to which the present invention is suitably applicable. As shown in FIG. 1, the drive system 10 according to the present embodiment is of a transversely installed type suitably used for an FF (front-engine front-drive) type vehicle, and is provided with a main vehicle drive power source in the form of an engine 12, a first electric motor MG1, a second electric motor MG2, a first differential mechanism in the form of a first planetary gear set 14, and a second differential mechanism in the form of a second planetary gear set 16, which are disposed on a common center axis CE. The drive system 10 is constructed substantially symmetrically with respect to the center axis CE. In FIG. 1, a lower half of the drive system 10 is not shown. This description applies to other embodiments which will be described.

The engine 12 is an internal combustion engine such as a gasoline engine, which is operable to generate a drive force by combustion of a fuel such as a gasoline injected into its cylinders. Each of the first electric motor MG1 and second electric motor MG2 is a so-called motor/generator having a function of a motor operable to generate a drive force, and a function of an electric generator operable to generate a reaction force, and is provided with a stator 18, 22 fixed to a stationary member in the form of a housing (casing) 26, and a rotor 20, 24 disposed radially inwardly of the stator 18, 22.

The first planetary gear set 14 is a single-pinion type planetary gear set which has a gear ratio ρ1 and which is provided with rotary elements (elements) consisting of a first rotary element in the form of a sun gear S1; a second rotary element in the form of a carrier C1 supporting a pinion gear P1 such the pinion gear P1 is rotatable about its axis and the axis of the planetary gear set; and ah third rotary element in the form of a ring gear R1 meshing with the sun gear S1 through the pinion gear P1. The second planetary gear set 16 is a single-pinion type planetary gear set which has a gear ratio ρ2 and which is provided with rotary elements (elements) consisting of: a first rotary element in the form of a sun gear S2; a second rotary element in the form of a carrier C2 supporting a pinion gear P2 such the pinion gear P2 is rotatable about its axis and the axis of the planetary gear set; and a third rotary element in the form of a ring gear R2 meshing with the sun gear S2 through the pinion gear P2.

The sun gear S1 of the first planetary gear set 14 is connected to the rotor 20 of the first electric motor MG1. The carrier C1 of the first planetary gear set 14 is connected to an input shaft 28 which is rotated integrally with a crankshaft of the engine 12. This input shaft 28 is rotated about the center axis CE. In the following description, the direction of extension of this center axis CE will be referred to as an "axial direction", unless otherwise specified. The ring gear R1 of the first planetary gear set 14 is connected to an output rotary member in the form of an output gear 30, and to the ring gear R2 of the second planetary gear set 16. The sun gear S2 of the second planetary gear set 16 is connected to the rotor 24 of the second electric motor MG2.

The drive force received by the output gear 30 is transmitted to a pair of left and right drive wheels (not shown) through a differential gear device not shown and axles not shown. On the other hand, a torque received by the drive wheels from a roadway surface on which the vehicle is running is transmitted (input) to the output gear 30 through the differential gear device and axles, and to the drive system 10. A mechanical oil pump 32, which is a vane pump, for instance, is connected to one of opposite end portions of the input shaft 28, which one end portion is remote from the engine 12. The oil pump 32 is operated by the engine 12, to generate a hydraulic pressure to be applied to a hydraulic control unit 60, etc. which will be described. An electrically operated oil pump which is driven by electric energy can be installed in addition to the oil pump 32.

Between the carrier C1 of the first planetary gear set 14 and the carrier C2 of the second planetary gear set 16, there is disposed a clutch CL which is configured to selectively couple these carriers C1 and C2 to each other (to selectively connect the carriers C1 and C2 to each other or disconnect the carriers C1 and C2 from each other). Between the carrier C2 of the second planetary gear set 16 and the stationary member in the form of the housing 26, there is disposed a brake BK which is configured to selectively couple (fix) the carrier C2 to the housing 26. Each of these clutch CL and brake BK is a hydraulically operated coupling device the operating state of which is controlled (which is engaged and released) according to the hydraulic pressure applied thereto from the hydraulic control unit 60. While wet multiple-disc type frictional coupling devices are preferably used as the clutch CL and brake BK, meshing type coupling devices, namely, so-called dog clutches (claw clutches) may also be used. Alternatively, the clutch CL and brake BK may be electromagnetic clutches, magnetic powder clutches and any other clutches the operating states of which are controlled (which are engaged and released) according to electric commands generated from an electronic control device 40.

As shown in FIG. 1, the drive system 10 is configured such that the first planetary gear set 14 and second planetary gear set 16 are disposed coaxially with the input shaft 28 (disposed on the center axis CE), and opposed to each other in the axial direction of the center axis CE. Namely, the first planetary gear set 14 is disposed on one side of the second planetary gear set 16 on a side of the engine 12, in the axial direction of the center axis CE. The first electric motor MG1 is disposed on one side of the first planetary gear set 14 on the side of the engine 12, in the axial direction of the center axis CE. The second electric motor MG2 is disposed on one side of the second planetary gear set 16 which is remote from the engine 12, in the axial direction of the center axis CE. Namely, the first electric motor MG1 and second electric motor MG2 are opposed to each other in the axial direction of the center axis CE, such that the first planetary gear set 14 and second planetary gear set 16 are interposed between the first electric motor MG1 and second electric motor MG2. That is, the drive system 10 is configured such that the first electric motor MG1, first planetary gear set 14, clutch CL, second planetary gear set 16, brake BK and second electric motor MG2 are disposed coaxially with each other, in the order of description from the side of the engine 12, in the axial direction of the center axis CE.

Figure 2:
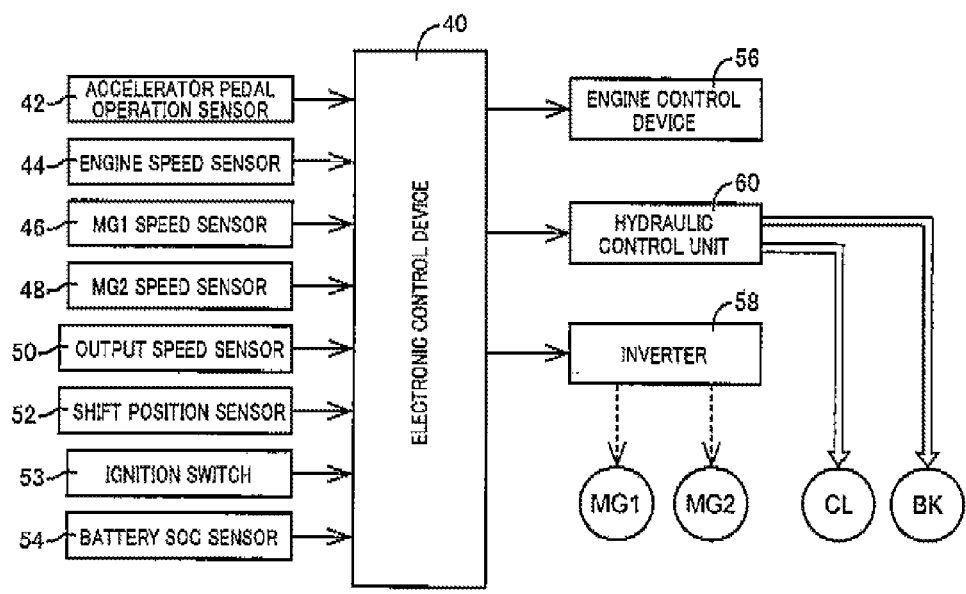
FIG. 2 is a view for explaining major portions of a control system provided to control the drive system of FIG. 1.

FIG. 2 is the view for explaining major portions of a control system provided to control the drive system 10. The electronic control device 40 shown in FIG. 2 is a so-called microcomputer which incorporates a CPU, a ROM, a RAM and an input-output interface and which is operable to perform signal processing operations according to programs stored in the ROM while utilizing a temporary data storage function of the RAM, to implement various drive controls of the drive system 10, such as a drive control of the engine 12 and hybrid drive controls of the first electric motor MG1 and second electric motor MG2. In the present embodiment, the electronic control device 40 corresponds to a drive control device for a hybrid vehicle having the drive system 10. The electronic control device 40 may be constituted by mutually independent control units as needed for respective controls such as an output control of the engine 12 and drive controls of the first electric motor MG1 and second electric motor MG2.

As indicated in FIG. 2, the electronic control device 40 is configured to receive various signals from sensors and switches provided in the drive system 10. Namely, the electronic control device 40 receives: an output signal of an accelerator pedal operation amount sensor 42 indicative of an operation amount or angle $A_{CC}$ of an accelerator pedal (not shown), which corresponds to a vehicle output required by a vehicle operator; an output signal of an engine speed sensor 44 indicative of an engine speed $N_E$, that is, an operating speed of the engine 12; an output signal of an MG1 speed sensor 46 indicative of an operating speed $N_{MG1}$ of the first electric motor MG1; an output signal of an MG2 speed sensor 48 indicative of an operating speed $N_{MG2}$ of the second electric motor MG2; an output signal of an output speed sensor 50 indicative of a rotating speed $N_{OUT}$ of the output gear 30, which corresponds to a running speed V of the vehicle; an output signal of a shift position sensor 52 indicative of a presently selected operating position $P_S$ of a manually operated shifting device not shown; an output signal of an ignition switch 53 indicative of a presently selected one of its "ON" state for operating the engine 12 and "OFF" state for stopping the engine 12; and an output signal of a battery SOC sensor 54 indicative of an electric energy amount SOC stored in a battery not shown (a state of charge SOC of the battery).

The electronic control device 40 is also configured to generate various control commands to be applied to various portions of the drive system 10. Namely, the electronic control device 40 applies to an engine control device 56 for controlling an output of the engine 12, following engine output control commands for controlling the output of the engine 12, which commands include: a fuel injection amount control signal to control an amount of injection of a fuel by a fuel injecting device into an intake pipe; an ignition control signal to control a timing of ignition of the engine 12 by an igniting device; and an electronic throttle valve drive control signal to control a throttle actuator for controlling an opening angle $\theta_{TH}$ of an electronic throttle valve. Further, the electronic control device 40 applies command signals to an inverter 58, for controlling operations of the first electric motor MG1 and second electric motor MG2, so that the first and second electric motors MG1 and MG2 are operated with electric energies supplied thereto from a battery through the inverter 58 according to the command signals to control outputs (output torques) of the electric motors MG1 and MG2. Electric energies generated by the first and second electric motors MG1 and M2 are supplied to and stored in the battery through the inverter 58. Further, the electronic control device 40 applies command signals for controlling operating states of the clutch CL and brake BK, to linear solenoid valves and other electromagnetic control valves provided in the hydraulic control unit 60, so that hydraulic pressures generated by those electromagnetic control valves are controlled to control the operating states of the clutch CL and brake BK.

An operating state of the drive system 10 is controlled through the first electric motor MG1 and second electric motor MG2, such that the drive system 10 functions as an electrically controlled differential portion whose difference of input and output speeds is controllable. For example, an electric energy generated by the first electric motor MG1 is supplied to the battery or the second electric motor MG2 through the inverter 58. Namely, a major portion of a drive force of the engine 12 is mechanically transmitted to the output gear 30, while the remaining portion of the drive force is consumed by the first electric motor MG1 operating as the electric generator, and converted into the electric energy, which is supplied to the second electric motor MG2 through the inverter 58, so that the second electric motor MG2 is operated to generate a drive force to be transmitted to the output gear 30. Components associated with the generation of the electric energy and the consumption of the generated electric energy by the second electric motor MG2 constitute an electric path through which a portion of the drive force of the engine 12 is converted into an electric energy which is converted into a mechanical energy.

Figures 3, 4:
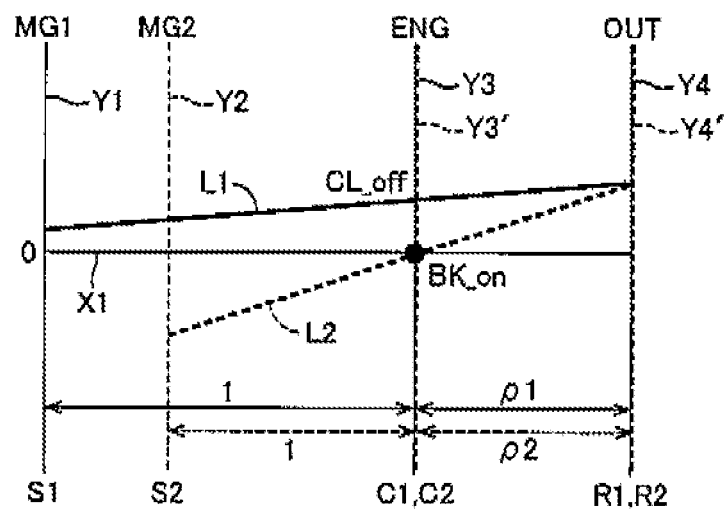
FIG. 3 is a table indicating combinations of operating states of a clutch and a brake, which correspond to respective five drive modes of the drive system of FIG. 1.
FIG. 4 is a collinear chart having straight lines which permit indication thereon of relative rotating speeds of various rotary elements of the drive system of FIG. 1, the collinear chart corresponding to the modes 1 and 3 of FIG. 3.

In the hybrid vehicle provided with the drive system 10 constructed as described above, one of a plurality of drive modes is selectively established according to the operating states of the engine 12, first electric motor MG1 and second electric motor MG2, and the operating states of the clutch CL and brake BK. FIG. 3 is the table indicating combinations of the operating states of the clutch CL and brake BK, which correspond to the respective five drive modes of the drive system 10. In this table, "o" marks represent an engaged state while blanks represent a released state. The drive modes EV-1 and EV-2 indicated in FIG. 3 are EV drive modes in which the engine 12 is held at rest while at least one of the first electric motor MG1 and second electric motor MG2 is used as a vehicle drive power source. The drive modes HV-1, HV-2 and HV-3 are hybrid drive modes (HV modes) in which the engine 12 is operated as the vehicle drive power source while the first electric motor MG1 and second electric motor MG2 are operated as needed to generate a vehicle drive force and/or an electric energy. In these hybrid drive modes, at least one of the first electric motor MG1 and second electric motor MG2 is operated to generate a reaction force or placed in a non-load free state.

As is apparent from FIG. 3, the EV drive modes of the drive system 10 in which the engine 12 is held at rest while at least one of the first electric motor MG1 and second electric motor MG2 is used as the vehicle drive power source consist of: a mode 1 (drive mode 1) in the form of the drive mode EV-1 which is established in the engaged state of the brake BK and in the released state of the clutch CL; and a mode 2 (drive mode 2) in the form of the drive mode EV-2 which is established in the engaged states of both of the brake BK and clutch CL. The hybrid drive modes in which the engine 12 is operated as the vehicle drive power source while the first electric motor MG1 and second electric motor MG2 are operated as needed to generate a vehicle drive force and/or an electric energy, consist of: a mode 3 (drive mode 3) in the form of the drive mode HV-1 which is established in the engaged state of the brake BK and in the released state of the clutch CL; a mode 4 (drive mode 4) in the form of the drive mode HV-2 which is established in the released state of the brake BK and in the engaged state of the clutch CL; and a mode 5 (drive mode 5) in the form of the drive mode HV-3 which is established in the released states of both of the brake BK and clutch CL.

FIGS. 4-7 are the collinear charts having straight lines which permit indication thereon of relative rotating speeds of the various rotary elements of the drive system 10 (first planetary gear set 14 and second planetary gear set 16), which rotary elements are connected to each other in different manners corresponding to respective combinations of the operating states of the clutch CL and brake BK. These collinear charts are defined in a two-dimensional coordinate system having a horizontal axis along which relative gear ratios ρ of the first and second planetary gear sets 14 and 16 are taken, and a vertical axis along which the relative rotating speeds are taken. The collinear charts indicated the relative rotating speeds when the output gear 30 is rotated in the positive direction to drive the hybrid vehicle in the forward direction. A horizontal line X1 represents the rotating speed of zero, while vertical lines Y1 through Y4 arranged in the order of description in the rightward direction represent the respective relative rotating speeds of the sun gear S1, sun gear S2, carrier C1 and ring gear R1. Namely, a solid line Y1 represents the relative rotating speed of the sun gear S1 of the first planetary gear set 14 (operating speed of the first electric motor MG1), a broken line Y2 represents the relative rotating speed of the sun gear S2 of the second planetary gear set 16 (operating speed of the second electric motor MG2), a solid line Y3 represents the relative rotating speed of the carrier C1 of the first planetary gear set 14 (operating speed of the engine 12), a broken line Y3' represents the relative rotating speed of the carrier C2 of the second planetary gear set 16, a solid line Y4 represents the relative rotating speed of the ring gear R1 of the first planetary gear set 14 (rotating speed of the output gear 30), and a broken line Y4' represents the relative rotating speed of the ring gear R2 of the second planetary gear set 16. In FIGS. 4-7, the vertical lines Y3 and Y3' are superimposed on each other, while the vertical lines Y4 and Y4' are superimposed on each other. Since the ring gears R1 and R2 are fixed to each other, the relative rotating speeds of the ring gears R1 and R2 represented by the vertical lines Y4 and Y4' are equal to each other.

In FIGS. 4-7, a solid line L1 represents the relative rotating speeds of the three rotary elements of the first planetary gear set 14, while a broken line L2 represents the relative rotating speeds of the three rotary elements of the second planetary gear set 16. Distances between the vertical lines Y1-Y4 (Y2-Y4') are determined by the gear ratios $\rho1$ and $\rho2$ of the first and second planetary gear sets 14 and 16. Described more specifically, regarding the vertical lines Y1, Y3 and Y4 corresponding to the respective three rotary elements in the form of the sun gear S1, carrier C1 and ring gear R1 of the first planetary gear set 14, a distance between the vertical lines Y1 and Y3 corresponds to "1", while a distance between the vertical lines Y3 and Y4 corresponds to the gear ratio "$\rho1$". Regarding the vertical lines Y2, Y3' and Y4' corresponding to the respective three rotary elements in the form of the sun gear S2, carrier C2 and ring gear R2 of the second planetary gear set 16, a distance between the vertical lines Y2 and Y3' corresponds to "1", while a distance between the vertical lines Y3' and Y4' corresponds to the gear ratio "$\rho2$". In the drive system 10, the gear ratio $\rho2$ of the second planetary gear set 16 is higher than the gear ratio $\rho1$ of the first planetary gear set 14 ($\rho2>\rho1$). The drive modes of the drive system 10 will be described by reference to FIGS. 4-7.

The drive mode EV-1 indicated in FIG. 3 corresponds to the mode 1 (drive mode 1) of the drive system 10, which is preferably the EV drive mode in which the engine 12 is held at rest while the second electric motor MG2 is used as the vehicle drive power source. FIG. 4 is the collinear chart corresponding to the mode 1. Described by reference to this collinear chart, the carrier C1 of the first planetary gear set 14 and the carrier C2 of the second planetary gear set 16 are rotatable relative to each other in the released state of the clutch CL. In the engaged state of the brake BK, the carrier C2 of the second planetary gear set 16 is coupled (fixed) to the stationary member in the form of the housing 26, so that the rotating speed of the carrier C2 is held zero. In this mode 1, the rotating direction of the sun gear S2 and the rotating direction of the ring gear R2 in the second planetary gear set 16 are opposite to each other, so that when the second electric motor MG2 is operated to generate a negative torque (acting in the negative direction), the ring gear R2, that is, the output gear 30 is rotated in the positive direction by the generated negative torque. Namely, the hybrid vehicle provided with the drive system 10 is driven in the forward direction when the negative torque is generated by the second electric motor MG2. In this case, the first electric motor MG1 is preferably held in a free state. In this mode 1, the clutches C1 and C2 are permitted to be rotated relative to each other, so that the hybrid vehicle can be driven in the EV drive mode similar to an EV drive mode which is established in a vehicle provided with a so-called "THS" (Toyota Hybrid System) and in which the clutch C2 is fixed to the stationary member.

Figure 5:
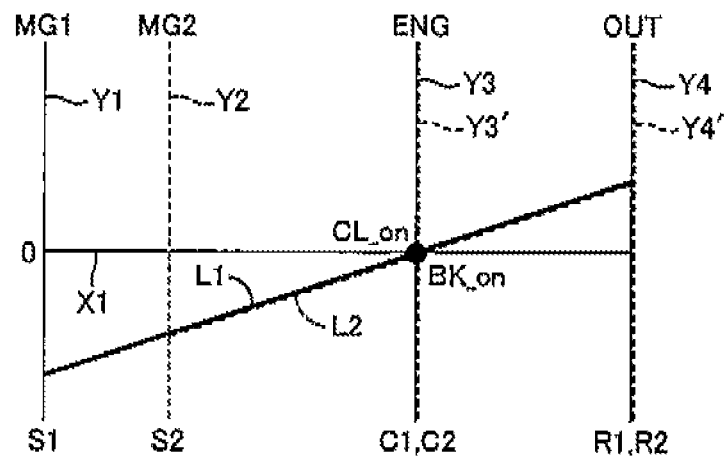
FIG. 5 is a collinear chart having straight lines which permit indication thereon of relative rotating speeds of various rotary elements of the drive system of FIG. 1, the collinear chart corresponding to the mode 2 of FIG. 3.

The drive mode EV-2 indicated in FIG. 3 corresponds to the mode 2 (drive mode 2) of the drive system 10, which is preferably the EV drive mode in which the engine 12 is held at rest while at least one of the first electric motor MG1 and second electric motor MG2 is used as the vehicle drive power source. FIG. 5 is the collinear chart corresponding to the mode 2. Described by reference to this collinear chart, the carrier C1 of the first planetary gear set 14 and the carrier C2 of the second planetary gear set 16 are not rotatable relative to each other in the engaged state of the clutch CL. Further, in the engaged state of the brake BK, the carrier C2 of the second planetary gear set 16 and the carrier C1 of the first planetary gear set 14 which is connected to the carrier C2 are coupled (fixed) to the stationary member in the form of the housing 26, so that the rotating speeds of the carriers C1 and C2 are held zero. In this mode 2, the rotating direction of the sun gear S1 and the rotating direction of the ring gear R1 in the first planetary gear set 14 are opposite to each other and the rotating direction of the sun gear S2 and the rotating direction of the ring gear R2 in the second planetary gear set 16 are opposite to each other, so that when the first electric motor MG1 and/or second electric motor MG2 is/are operated to generate a negative torque (acting in the negative direction), the ring gears R1 and R2 are rotated, that is, the output gear 30 is rotated in the positive direction by the generated negative torque. Namely, the hybrid vehicle provided with the drive system 10 is driven in the forward direction when the negative torque is generated by at least one of the first electric motor MG1 and second electric motor MG2.

In the mode 2, at least one of the first electric motor MG1 and second electric motor MG2 may be operated as the electric generator. In this case, one or both of the first and second electric motors MG1 and MG2 may be operated to generate a vehicle drive force (torque), at an operating point assuring a relatively high degree of operating efficiency, and/or with a reduced degree of torque limitation due to heat generation. Further, at least one of the first and second electric motors MG1 and MG2 may be held in a free state, when the generation of an electric energy by a regenerative operation of the electric motors MG1 and MG2 is inhibited due to full charging of the battery. Namely, the mode 2 is an EV drive mode which may be established under various running conditions of the hybrid vehicle, or may be kept for a relatively long length of time. Accordingly, the mode 2 is advantageously provided on a hybrid vehicle such as a plug-in hybrid vehicle, which is frequently placed in an EV drive mode.

The drive mode HV-1 indicated in FIG. 3 corresponds to the mode 3 (drive mode 3) of the drive system 10, which is preferably the HV drive mode in which the engine 12 is used as the vehicle drive power source while the first electric motor MG1 and second electric motor MG2 are operated as needed to generate a vehicle drive force and/or an electric energy. FIG. 4 is the collinear chart corresponding to the mode 3. Described by reference to this collinear chart, the carrier C1 of the first planetary gear set 14 and the carrier C2 of the second planetary gear set 16 are rotatable relative to each other, in the released state of the clutch CL. In the engaged state of the brake BK, the carrier C2 of the second planetary gear set 16 is coupled (fixed) to the stationary member in the form of the housing 26, so that the rotating speed of the carrier C2 is held zero. In this mode 3, the engine 12 is operated to generate an output torque by which the output gear 30 is rotated. At this time, the first electric motor MG1 is operated to generate a reaction torque in the first planetary gear set 14, so that the output of the engine 12 can be transmitted to the output gear 30. In the second planetary gear set 16, the rotating direction of the sun gear S2 and the rotating direction of the ring gear R2 are opposite to each other, in the engaged state of the brake BK, so that when the second electric motor MG2 is operated to generate a negative torque (acting in the negative direction), the ring gears R1 and R2 are rotated, that is, the output gear 30 is rotated in the positive direction by the generated negative torque.

Figure 6:
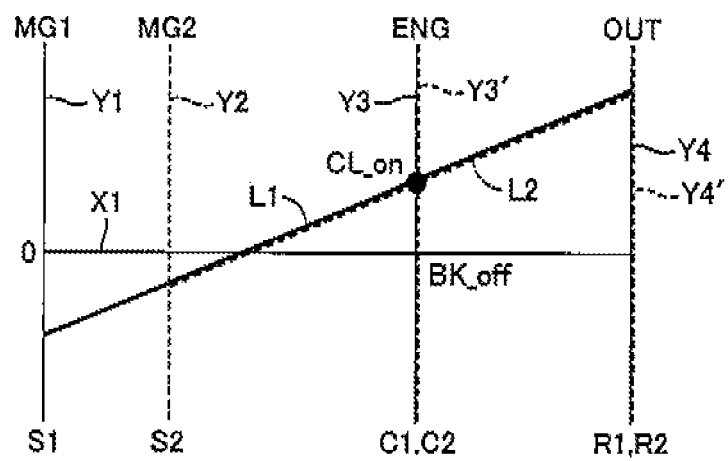
FIG. 6 is a collinear chart having straight lines which permit indication thereon of relative rotating speeds of various rotary elements of the drive system of FIG. 1, the collinear chart corresponding to the mode 4 of FIG. 3.

The drive mode HV-2 indicated in FIG. 3 corresponds to the mode 4 (drive mode 4) of the drive system 10, which is preferably the HV drive mode in which the engine 12 is used as the vehicle drive power source while the first electric motor MG1 and second electric motor MG2 are operated as needed to generate a vehicle drive force and/or an electric energy. FIG. 6 is the collinear chart corresponding to the mode 4. Described by reference to this collinear chart, the carrier C1 of the first planetary gear set 14 and the carrier C2 of the second planetary gear set 16 are not rotatable relative to each other, in the engaged state of the clutch CL, that is, the carriers C1 and C2 are integrally rotated as a single rotary element. The ring gears R1 and R2, which are fixed to each other, are integrally rotated as a single rotary element. Namely, in the mode 4 of the drive system 10, the first planetary gear set 14 and second planetary gear set 16 function as a differential mechanism having a total of four rotary elements. That is, the drive mode 4 is a composite split mode in which the four rotary elements consisting of the sun gear S1 (connected to the first electric motor MG1), the sun gear S2 (connected to the second electric motor MG2), the rotary element constituted by the carriers C1 and C2 connected to each other (and to the engine 12), and the rotary element constituted by the ring gears R1 and R2 fixed to each other (and connected to the output gear 30) are connected to each other in the order of description in the rightward direction as seen in FIG. 6.

In the mode 4, the rotary elements of the first planetary gear set 14 and second planetary gear set 16 are preferably arranged as indicated in the collinear chart of FIG. 6, that is, in the order of the sun gear S1 represented by the vertical line Y1, the sun gear S2 represented by the vertical line Y2, the carriers C1 and C2 represented by the vertical line Y3 (Y3'), and the ring gears R1 and R2 represented by the vertical line Y4 (Y4'). The gear ratios ρ1 and ρ2 of the first and second planetary gear sets 14 and 16 are determined such that the vertical line Y1 corresponding to the sun gear S1 and the vertical line Y2 corresponding to the sun gear S2 are positioned as indicated in the collinear chart of FIG. 6, namely, such that the distance between the vertical lines Y1 and Y3 is longer than the distance between the vertical lines Y2 and Y3'. In other words, the distance between the vertical lines corresponding to the sun gear S1 and the carrier C1 and the distance between the vertical lines corresponding to the sun gear S2 and the carrier C2 correspond to "1", while the distance between the vertical lines corresponding to the carrier C1 and the ring gear R1 and the distance between the vertical lines corresponding to the carrier C2 and the ring gear R2 correspond to the respective gear ratios ρ1 and ρ2. Accordingly, the drive system 10 is configured such that the gear ratio ρ2 of the second planetary gear set 16 is higher than the gear ratio ρ1 of the first planetary gear set 14.

In the mode 4, the carrier C1 of the first planetary gear set 14 and the carrier C2 of the second planetary gear set 16 are connected to each other in the engaged state of the clutch CL, so that the carriers C1 and C2 are rotated integrally with each other. Accordingly, either one or both of the first electric motor MG1 and second electric motor MG2 can generate a reaction force corresponding to the output of the engine 12. Namely, one or both of the first and second electric motors MG1 and MG2 can be operated to generate a reaction force or reaction forces during an operation of the engine 12, at an operating point assuring a relatively high degree of operating efficiency, and/or with a reduced degree of torque limitation due to heat generation.

For example, one of the first electric motor MG1 and second electric motor MG2 which is operable with a higher degree of operating efficiency is preferentially operated to generate a reaction force, so that the overall operating efficiency can be improved. When the hybrid vehicle is driven at a comparatively high running speed V and at a comparatively low engine speed $N_E$, for instance, the operating speed $N_{MG1}$ of the first electric motor MG1 may have a negative value, that is, the first electric motor MG1 may be operated in the negative direction. In the case where the first electric motor MG1 generates the reaction force acting on the engine 12, the first electric motor MG1 is operated in the negative direction so as to generate a negative torque with consumption of an electric energy, giving rise to a risk of reduction of the operating efficiency. In this respect, it will be apparent from FIG. 6 that in the drive system 10, the operating speed of the second electric motor MG2 indicated on the vertical line Y2 is less likely to have a negative value than the operating speed of the above-indicated first electric motor MG1 indicated on the vertical line Y1, and the second electric motor MG2 may possibly be operated in the positive direction, during generation of the reaction force. Accordingly, it is possible to improve the operating efficiency to improve the fuel economy, by preferentially controlling the second electric motor MG2 so as to generate the reaction force, while the operating speed of the first electric motor MG1 has a negative value. Further, where there is a torque limitation of one of the first electric motor MG1 and second electric motor MG2 due to heat generation, it is possible to ensure the generation of the reaction force required for the engine 12, by controlling the other electric motor so as to perform a regenerative operation or a vehicle driving operation, for providing an assisting vehicle driving force.

Figure 8:
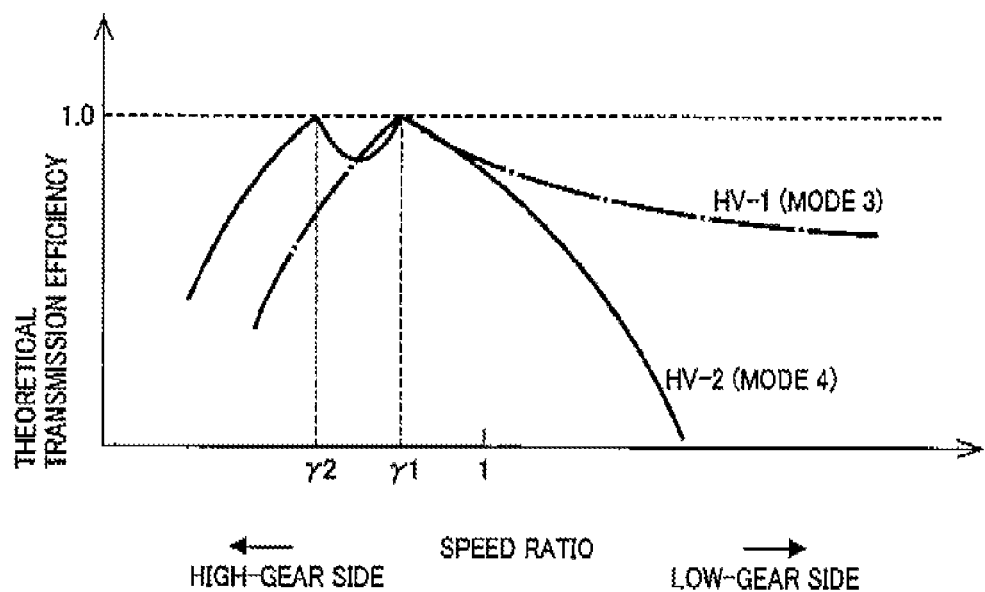
FIG. 8 is a view for explaining transmission efficiency of the drive system of FIG. 1.

FIG. 8 is the view for explaining transmission efficiency of the drive system 10, wherein the speed ratio is taken along the horizontal axis while theoretical transmission efficiency is taken along the vertical axis. The speed ratio indicated in FIG. 8 is a ratio of the input side speed of the first planetary gear set 14 and second planetary gear set 16 to the output side speed, that is, the speed reduction ratio, which is for example, a ratio of the rotating speed of the input rotary member in the form of the carrier C1 to the rotating speed of the output gear 30 (ring gears R1 and R2). The speed ratio is taken along the horizontal axis in FIG. 8 such that the left side as seen in the view of FIG. 8 is a side of high gear positions having comparatively low speed ratio values while the right side is a side of low gear positions having comparatively high speed ratio values. Theoretical transmission efficiency indicated in FIG. 8 is a theoretical value of the transmission efficiency of the drive system 10, which has a maximum value of 1.0 when an entirety of the drive force is mechanically transmitted from the first planetary gear set 14 and second planetary gear set 16 to the output gear 30, without transmission of an electric energy through the electric path.

In FIG. 8, a one-dot chain line represents the transmission efficiency of the drive system 10 placed in the mode 3 (HV-1), while a solid line represents the transmission efficiency in the mode 4 (HV-2). As indicated in FIG. 8, the transmission efficiency of the drive system 10 in the mode 3 (HV-1) has a maximum value at a speed ratio value $\gamma 1$. At this speed ratio value $\gamma 1$, the operating speed of the first electric motor MG1 (rotating speed of the sun gear S1) is zero, and an amount of an electric energy transmitted through the electric path is zero during generation of the reaction force, so that the drive force is only mechanically transmitted from the engine 12 and the second electric motor MG2 to the output gear 30, at an operating point corresponding to the speed ratio value $\gamma 1$. This operating point at which the transmission efficiency is maximum while the amount of the electric energy transmitted through the electric path is zero will be hereinafter referred to as a "mechanical point (mechanical transmission point)". The speed ratio value $\gamma 1$ is lower than "1", that is, a speed ratio on over drive side on the low-gear side, and will be hereinafter referred to as a "first mechanical transmission speed ratio value $\gamma 1$". As indicated in FIG. 8, the transmission efficiency in the mode 3 gradually decreases with an increase of the speed ratio from the first mechanical transmission speed ratio value $\gamma 1$ toward the low-gear side, and abruptly decreases with a decrease of the speed ratio from the first mechanical transmission speed ratio value $\gamma 1$ toward the high-gear side.

In the mode 4 (HV-2) of the drive system 10, the gear ratios $\rho 1$ and $\rho 2$ of the first planetary gear set 14 and second planetary gear set 16 having the four rotary elements in the engaged state of the clutch CL are determined such that the operating speeds of the first electric motor MG1 and second electric motor MG2 are indicated at respective different positions along the horizontal axis of the collinear chart of FIG. 6, so that the transmission efficiency in the mode 4 has a maximum value at a mechanical point at a speed ratio value $\gamma 2$, as well as at the speed ratio value $\gamma 1$, as indicated in FIG. 8. Namely, in the mode 4, the rotating speed of the first electric motor MG1 is zero at the first mechanical transmission speed ratio value $\gamma 1$ at which the amount of the electric energy transmitted through the electric path is zero during generation of the reaction force by the first electric motor MG1, while the rotating speed of the second electric motor MG2 is zero at the speed ratio value $\gamma 2$ at which the amount of the electric energy transmitted through the electric path is zero during generation of the reaction force by the second electric motor MG2. The speed ratio value $\gamma 2$ will be hereinafter referred to as a "second mechanical transmission speed ratio value $\gamma 2$". This second mechanical transmission speed ratio value $\gamma 2$ is smaller than the first mechanical transmission speed ratio value $\gamma 1$. In the mode 4, the drive system 10 has the mechanical point located on the high-gear side of the mechanical point in the mode 3.

As indicated in FIG. 8, the transmission efficiency in the mode 4 more abruptly decreases with an increase of the speed ratio on a low-gear side of the first mechanical transmission speed ratio value $\gamma 1$, than the transmission efficiency in the mode 3. In a region of the speed ratio between the first mechanical transmission speed ratio value $\gamma 1$ and second mechanical transmission speed ratio value $\gamma 2$, the transmission efficiency in the mode 4 changes along a concave curve. In this region, the transmission efficiency in the mode 4 is almost equal to or higher than that in the mode 3. The transmission efficiency in the mode 4 decreases with a decrease of the speed ratio from the second mechanical transmission speed ratio value $\gamma 2$ toward the high-gear side, but is higher than that in the mode 3. That is, the drive system placed in the mode 4 has not only the first mechanical transmission speed ratio value $\gamma 1$, but also the second mechanical transmission speed ratio value $\gamma 2$ on the high-gear side of the first mechanical transmission speed ratio value $\gamma 1$, so that the transmission efficiency of the drive system can be improved in high-gear positions having comparatively low speed ratio values. Thus, a fuel efficiency during running with relatively high speed is improved due to improvement of the transmission efficiency.

As described above referring to FIG. 8, the transmission efficiency of the drive system 10 during a hybrid running of the vehicle with an operation of the engine 12 used as the vehicle drive power source and operations of the first and second electric motors MG1 and MG2 as needed to generate a vehicle drive force and/or an electric energy can be improved by adequately switching the vehicle drive mode between the mode 3 (HV-1) and mode 4 (HV-2). For instance, the mode 3 is established in low-gear positions having speed ratio values lower than the first mechanical transmission speed ratio value $\gamma 1$, while the mode 4 is established in high-gear positions having speed ratio values higher than the first mechanical transmission speed ratio value $\gamma 1$, so that the transmission efficiency can be improved over a wide range of the speed ratio covering the low-gear region and the high-gear region.

Figure 7:
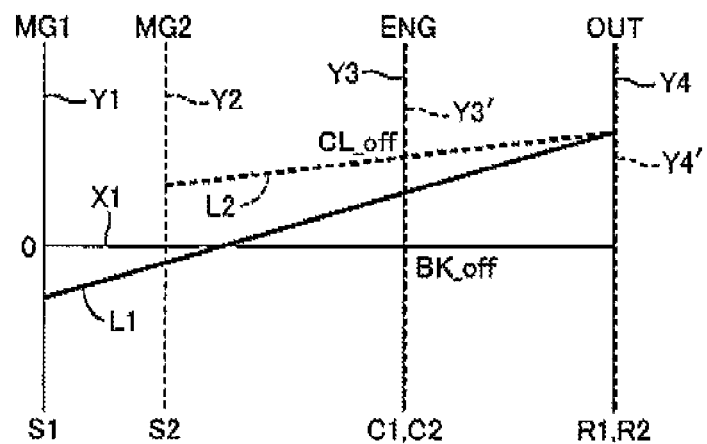
FIG. 7 is a collinear chart having straight lines which permit indication thereon of relative rotating speeds of various rotary elements of the drive system of FIG. 1, the collinear chart corresponding to the mode 5 of FIG. 3.

The drive mode HV-3 indicated in FIG. 3 corresponds to the mode 5 (drive mode 5) of the drive system 10, which is preferably the hybrid drive mode in which the engine 12 is operated as the vehicle drive power source while the first electric motor MG1 is operated as needed to generate a vehicle drive force and/or an electric energy. In this mode 5, the engine 12 and first electric motor MG1 may be operated to generate a vehicle drive force, with the second electric motor MG2 being disconnected from the drive line. FIG. 7 is the collinear chart corresponding to this mode 5. Described by reference to this collinear chart, the carrier C1 of the first planetary gear set 14 and the carrier C2 of the second planetary gear set 16 are rotatable relative to each other in the released state of the clutch CL. In the released state of the brake BK, the carrier C2 of the second planetary gear set 16 is rotatable relative to the stationary member in the form of the housing 26. In this arrangement, the second electric motor MG2 can be held at rest while it is disconnected from the drive line (power transmitting path).

In the mode 3 in which the brake BK is placed in the engaged state, the second electric motor MG2 is kept in an operated state together with a rotary motion of the output gear 30 (ring gear R2) during running of the vehicle. In this operating state, the operating speed of the second electric motor MG2 may reach an upper limit value (upper limit) during running of the vehicle at a comparatively high speed, or a rotary motion of the ring gear R2 at a high speed is transmitted to the sun gear S2. In this respect, it is not necessarily desirable to keep the second electric motor MG2 in the operated state during running of the vehicle at a comparatively high speed, from the standpoint of the operating efficiency. In the mode 5, on the other hand, the engine 12 and the first electric motor MG1 may be operated to generate the vehicle drive force during running of the vehicle at the comparatively high speed, while the second electric motor MG2 is disconnected from the drive line, so that it is possible to reduce a power loss due to dragging of the unnecessarily operated second electric motor MG2, and to eliminate a limitation of the highest vehicle running speed corresponding to the permissible highest operating speed (upper limit of the operating speed) of the second electric motor MG2.

It will be understood from the foregoing description, the drive system 10 is selectively placed in one of the three hybrid drive modes in which the engine 12 is operated as the vehicle drive power source, namely, in one of the drive mode HV-1 (mode 3), drive mode HV-2 (mode 4) and drive mode HV-3 (mode 5), which are selectively established by respective combinations of the engaged and released states of the clutch CL and brake BK. Accordingly, the transmission efficiency can be improved to improve the fuel economy of the vehicle, by selectively establishing one of the three hybrid drive modes according to the vehicle running speed and the speed ratio, in which the transmission efficiency is the highest.

Figure 9:
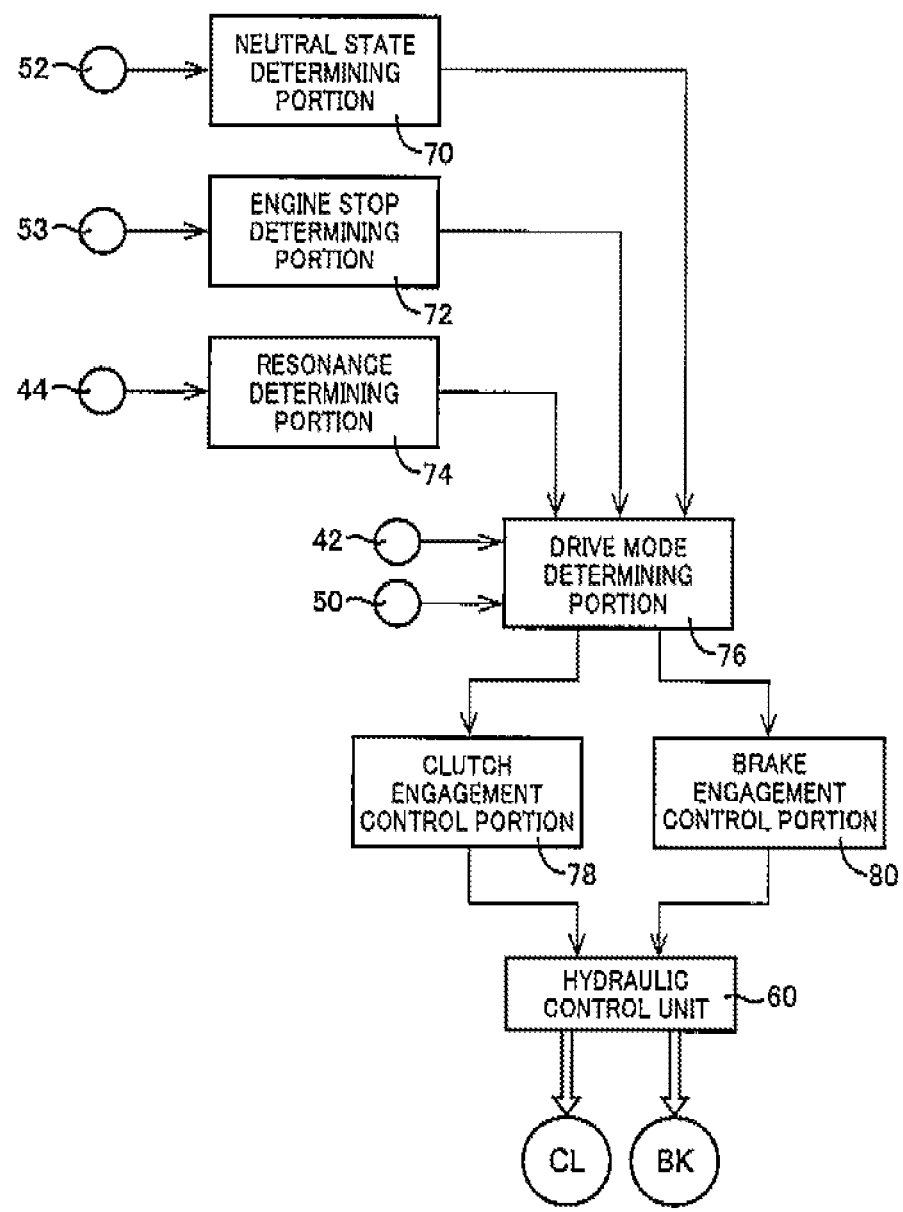
FIG. 9 is a functional block diagram for explaining major control functions of an electronic control device provided for the drive system of FIG. 1.

FIG. 9 is the functional block diagram for explaining major control functions of the electronic control device 40. A neutral state determining portion 70 shown in FIG. 9 is configured to determine whether the drive system 10 is placed in a neutral state. For instance, the neutral state determining portion 70 determines whether the presently selected operating position Ps of the manually operated shifting device detected by the shift position sensor 52 is a neutral position "N". If the presently selected operating position Ps of the manually operated shifting device is the neutral position "N", that is, if the drive system 10 is placed in the neutral state, the drive force is not transmitted from the output gear 30 to the drive wheels, with the first electric motor MG1 and the second electric motor MG2 being held in a shut-down state (held at rest), for example. Namely, when the drive system 10 is placed in the neutral state, the first and second electric motors MG1 and MG2 are held in a freely rotatable state, so that at least these first and second electric motors MG1 and MG2 do not contribute to a drive force that is transmitted from the output gear 30 to the drive wheels.

An engine stop determining portion 72 is configured to determine whether the engine 12 is required to be stopped while the engine 12 is in an operated state (under the control of the engine control device 56). For example, the engine stop determining portion 72 determines that the engine 12 is required to be stopped, when the output signal of the ignition switch 53 is changed from the signal indicative of the "ON" state for operating the engine 12 to the "OFF" state for stopping the engine 12. When the ignition switch 53 is brought to the "OFF" state, the engine 12 is brought to the rest state by the engine control device 56, by terminating the fuel supply by the fuel injecting device into an intake pipe and the engine ignition by the igniting device.

A resonance determining portion 74 is configured to determine whether a power transmitting system of the hybrid vehicle provided with the drive system 10 has a resonance. Namely, the resonance determining portion 74 detects or forecasts generation of a resonance in the power transmitting system. The "power transmitting system" means a system so-called "a drive line" for power transmission from the vehicle drive power source to the drive wheels. In the hybrid vehicle provided with the drive system 10, the power transmitting system is a power transmission system which is provided in a power transmitting path from the vehicle drive power source in the form of the engine 12, first electric motor MG1 and second electric motor MG2 to the drive wheels not shown, and which includes the first planetary gear set 14, second planetary gear set 16, input shaft 28 and output gear 30, and a damper, a differential gear device, drive wheels, and a body of the hybrid vehicle.

The resonance determining portion 74 is preferably configured to make the determination as whether the power transmitting system has a resonance or not, on the basis of the vehicle running speed V and the operating speed $N_E$ of the engine 12, and a predetermined relationship. When the hybrid vehicle is stationary, that is, when the vehicle running speed V is zero, the resonance determining portion 74 makes the determination as to whether the power transmitting system has a resonance, on the basis of the operating speed $N_E$ of the engine 12, and the predetermined relationship. For instance, the resonance determining portion 74 calculates a frequency of vibrations generated due to a rotary motion of the engine 12, on the basis of the engine speed $N_E$ detected by the engine speed sensor 44, and detects or forecasts the generation of a resonance in the power transmitting system, if the calculated frequency of the vibrations is substantially coincident with the resonance frequency of the power transmitting system, that is, falls within a predetermined range (frequency band) a center point of which is equal to the resonance frequency. The resonance frequency of the power transmitting system is determined by inertial values of various portions of the drive system 10, and by the operating states of the clutch CL and brake BK. That is, the resonance frequency values of the drive system 10 which correspond to the different combinations of the operating states of the clutch CL and brake BK are obtained by experimentation and stored in a memory. The resonance determining portion 74 is preferably configured to determine whether or not the frequency of the vibrations due to the rotary motion of the engine 12, which is calculated on the basis of the engine speed $N_E$, is substantially coincident with the resonance frequency value of the drive system 10 corresponding to the present combination of the operating states of the clutch CL and brake BK. If an affirmative determination is obtained, the resonance determining portion 74 detects or forecasts the generation of a resonance in the power transmitting system.

A drive mode determining portion 76 is configured to determine a presently established drive mode of the drive system 10. Preferably, the drive mode determining portion 76 is at least configured to determine whether the drive system 10 is presently placed in the above-indicated mode 3, namely, the drive mode HV-1 indicated in FIG. 3. For example, the drive mode determining portion 76 determines whether the drive system 10 is presently placed in the mode 3, on the basis of the vehicle running speed V and the accelerator pedal operation amount $A_{CC}$, and according to the predetermined relationship. Described more specifically, the drive mode determining portion 76 determines that the drive system 10 is placed in the mode 3, if the hybrid vehicle is running in a low-speed low-accelerator-opening condition in which the running speed V corresponding to the output speed $N_{OUT}$ detected by the output speed sensor 50 is not higher than a predetermined threshold value while the accelerator pedal operation amount $A_{CC}$ detected by the accelerator pedal operation amount sensor 42 is not larger than a predetermined threshold value. The drive mode determining portion 76 is further preferably configured to make the determination as to whether the drive system 10 is presently placed in the drive mode 3, if an affirmative determination is made by each of the above-described neutral state determining portion 70, engine stop determining portion 72 and resonance determining portion 74, that is, if the drive system 10 is placed in the neutral state, and the engine 12 in an operated state is required to be stopped, while the generation of a resonance in the power transmitting system of the hybrid vehicle provided with the drive system 10 is detected or forecasted.

A clutch engagement control portion 78 is configured to control the operating state of the clutch CL through the hydraulic control unit 60. Described more specifically, the clutch engagement control portion 78 controls an output hydraulic pressure of an electromagnetic control valve provided in the hydraulic control unit 60 to control the clutch CL, for regulating the hydraulic pressure which determines the operating state (torque capacity) of the clutch CL. Preferably, the clutch engagement control portion 78 controls the operating state of the clutch CL according to the drive mode determined by the drive mode determining portion 76. Basically, the clutch engagement control portion 78 controls the torque capacity of the clutch CL so as to be placed in an engaged state when the drive mode determining portion 76 has determined that the drive system 10 is presently placed in the drive mode 2 (EV-2) or the drive mode 4 (HV-2), and controls the torque capacity of the clutch CL so as to be placed in a released state when the drive mode determining portion 76 has determined that the drive system 10 is presently placed in the drive mode 1 (EV-1), the drive mode 3 (HV-1) or the drive mode 5 (HV-3).

A brake engagement control portion 80 is configured to control the operating state of the brake BK through the hydraulic control unit 60. Described more specifically, the brake engagement control portion 80 controls an output hydraulic pressure of an electromagnetic control valve provided in the hydraulic control unit 60 to control the brake BK, for regulating the hydraulic pressure which determines the operating state (torque capacity) of the brake BK. Preferably, the brake engagement control portion 80 controls the operating state of the brake BK according to the drive mode determined by the drive mode determining portion 76. Basically, the brake engagement control portion 80 controls the torque capacity of the brake BK so as to be placed in an engaged state when the drive mode determining portion 76 has determined that the drive system 10 is presently placed in the drive mode 1 (EV-1), the drive mode 2 (EV-2) or the drive mode 3 (HV-1), and controls the torque capacity of the brake BK so as to be placed in a released state when the drive mode determining portion 76 has determined that the drive system 10 is presently placed in the drive mode 4 (HV-2) or the drive mode 5 (HV-3).

The clutch engagement control portion 78 increases the torque capacity of the clutch CL through the hydraulic control unit 60, if the drive mode determining portion 76 has determined that the drive system 10 is presently placed in the drive mode 3 (HV-1), while the affirmative determination is obtained by each of the neutral state determining portion 70, engine stop determining portion 72 and resonance determining portion 74. Preferably, the clutch engagement control portion 78 brings the clutch CL to its engaged state (fully engaged state) in the above-indicated case. In other words, the clutch engagement control portion 78 increases the torque capacity of the clutch CL to bring the clutch CL to its engaged state, even when the drive mode determining portion 76 has determined that the drive system 10 is placed in the mode 3 (HV-1), if the affirmative determination is obtained by each of the neutral state determining portion 70, engine stop determining portion 72 and resonance determining portion 74, that is, if the engine 12 in an operated state is required to be stopped in the neutral state of the drive system 10 while the generation of a resonance in the power transmitting system of the hybrid vehicle provided with the drive system 10 is detected or forecasted. In this respect, it is noted that while the drive system 10 is placed in the mode 3 (HV-1), the brake BK is placed in the engaged state, as indicated in FIG. 3, so that the brake BK and the clutch CL are both placed in their engaged states in the above-indicated condition.

The brake engagement control portion 80 increases the torque capacity of the brake BK through the hydraulic control unit 60, if the drive mode determining portion 76 has determined that the drive system 10 is presently placed in the drive mode 4 (HV-2), while the affirmative determination is obtained by each of the neutral state determining portion 70, engine stop determining portion 72 and resonance determining portion 74. Preferably, the brake engagement control portion 80 brings the brake BK to its engaged state (fully engaged state) in the above-indicated case. In other words, the brake engagement control portion 80 increases the torque capacity of the brake BK to bring the brake BK to its engaged state, even when the drive mode determining portion 76 has determined that the drive system 10 is placed in the mode 4 (HV-2) if the affirmative determination is obtained by each of the neutral state determining portion 70, engine stop determining portion 72 and resonance determining portion 74, that is, if the engine 12 in an operated state is required to be stopped in the neutral state of the drive system 10 while the generation of a resonance in the power transmitting system of the hybrid vehicle provided with the drive system 10 is detected or forecasted. In this respect, it is noted that while the drive system 10 is placed in the mode 4 (HV-2), the clutch CL is placed in the engaged state, as indicated in FIG. 3, so that the brake BK and the clutch CL are both placed in their engaged states in the above-indicated condition.

Figure 10:
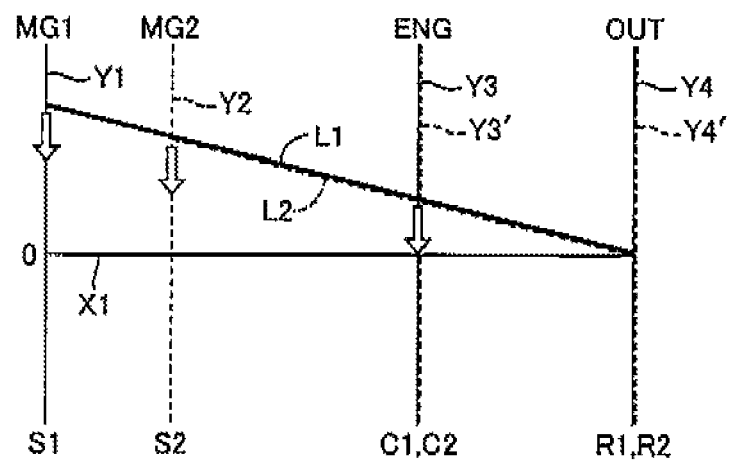
FIG. 10 is a collinear chart corresponding to the mode 4 of FIG. 3, for explaining a transition of the engine to a stop state while the vehicle is stationary.

FIG. 10 is the collinear chart corresponding to the mode 4 (HV-2) of FIG. 3, for explaining a transition of the engine 12 from an operated state to a stop state while the vehicle is stationary. As indicated in FIG. 10, the rotating speed of the carrier C1 of the first planetary gear set 14 indicated by a vertical line Y3 and the rotating speed of the carrier C2 of the second planetary gear set 16 indicated by a vertical line Y3' are equal to each other when the drive system 10 is placed in the mode 4 in which the clutch CL is placed in the engaged state. If the torque capacity of the brake BK is increased, that is, if an engaging force of the brake BK is increased, the rotating speed of the mutually connected carriers C1 and C2 relative to the housing 26 is gradually lowered, as indicated by a white arrow. Namely, a force (speed lowering force) to lower the operating speed $N_E$ of the engine 12 connected to the carrier C1 is generated. If the torque capacity of the clutch CL is increased, that is, if an engaging force of the clutch CL is increased when the drive system 10 is placed in the mode 3 (HV-1), on the other hand, the rotating speed of the carrier C1 relative to the carrier C2 fixed to the housing 26 by the brake BK is gradually lowered. Namely, a force to lower the operating speed $N_E$ of the engine 12 connected to the carrier C1 is generated, as described above with respect to the increase of the torque capacity of the brake BK by reference to FIG. 10.

Figure 11:
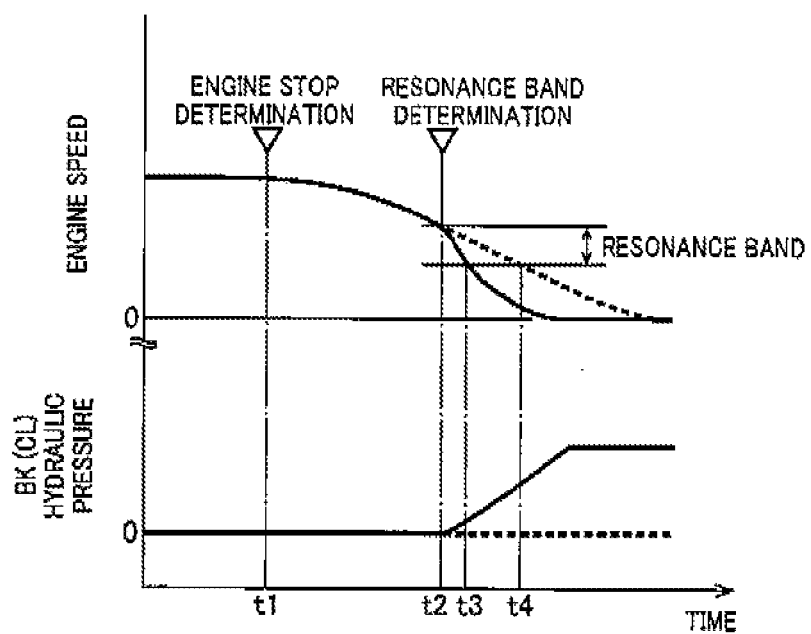
FIG. 11 is a time chart for explaining an engine stop control implemented in a neutral state according to an embodiment of this invention, together with an engine stop control according to the prior art.

FIG. 11 is the time chart for explaining a control implemented to stop the engine 12 in the neutral state. In this time chart, solid lines represent changes of controlled values with the time as a result of the control according to the present embodiment, while broken lines represent changes with the time as a result of the control according to the prior art. Initially, a requirement for stopping the engine 12 (generation of an engine stopping requirement) is determined at a point of time t1. At this point of time t1, the operation of the engine 12 is stopped by terminating the fuel supply by the fuel injecting device into the intake pipe and the engine ignition by the igniting device. During a time period from the point of time t1 to a point of time t2, the operating speed $N_E$ of the engine 12 is gradually lowered in a free-fall manner according to an inertia. At the point of time t2, the generation of a resonance in the power transmitting system of the hybrid vehicle provided with the drive system 10 is detected or forecasted. In the specific example of FIG. 11, a range of the operating speed $N_E$ of the engine 12 between the value at the point of time t2 and a predetermined value lower than the value at the point of time t2 corresponds to the resonance band of the power transmitting system in which the frequency of the vibrations due to the rotary motion of the engine 12 is substantially coincident with the resonance frequency of the power transmitting system.

According to the control in the present embodiment indicated by the solid lines, an increase of the torque capacity of at least one of the clutch CL and the brake BK is initiated at the point of time t2 at which the generation of the resonance is determined. As a result of this control, the engine speed $N_E$ is rapidly lowered, so that the engine speed $N_E$ is lowered to a value corresponding to a lower limit of the resonance band, at a point of time t3. According to the control in the prior art indicated by the broken lines, the operating speed $N_E$ of the engine 12 is kept lowered in the free-fall manner according to the inertia, even after the point of time t2 at which the generation of the resonance is determined. Therefore, the prior art control requires a longer length of time for lowering the engine speed $N_E$, than the control according to the present embodiment, that is, the engine speed $N_E$ is zeroed at a point of time t4 according to the prior art control. Namely, the prior art control requires a length of time (from the point of time t2 to the point of time t4) longer than the length of time (from the point of time t2 to the point of time t3) required by the control in the present embodiment, until the engine speed $N_E$ is lowered to the value corresponding to the lower limit of the resonance band. Accordingly, the prior art control has a higher risk of generation of noises and vibrations. In other words, the control to stop the engine 12 in the neutral state according to the present embodiment is effective to reduce the risk of generation of noises and vibrations.

The electronic control device 40 is preferably configured to stop the engine 12 through the engine control device 56, when it becomes possible to stop the engine 12 while the presently selected operating position Ps of the manually operated shifting device is the neutral position "N", even while the ignition switch 53 is placed in the "ON" state. An operation of the engine 12 while the presently selected operating position Ps of the manually operated shifting device is the neutral position "N", that is, while the drive system 10 is placed in the neutral state, causes generation of noises (so-called "neutral-position rattling noises") due to backlashes and rattling motions caused by a pulsation of the engine 12, in the absence of meshing of the gears in the first planetary gear set 14 and the second planetary gear set 16. For this reason, it is desirable to stop the engine 12 if it is possible to stop the engine 12 while the presently selected operating position Ps of the manually operated shifting device is the neutral position "N". The risk of generation of the noises and vibrations can be reduced in the present embodiment by implementing the control to increase the torque capacity of at least one of the clutch CL and the brake BK upon lowering of the operating speed $N_E$ of the engine 12.

Figure 12:
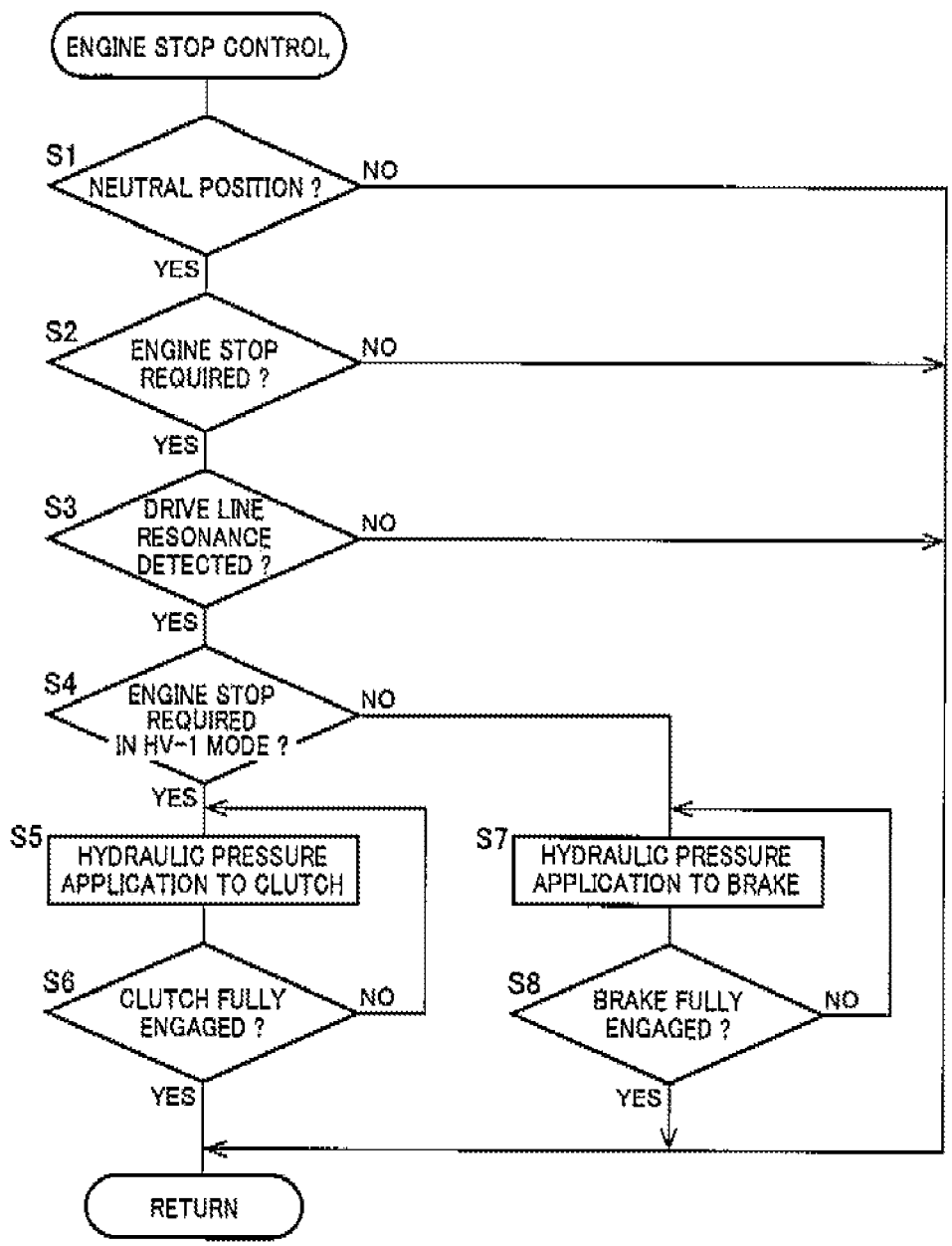
FIG. 12 is a flow chart for explaining a major portion of the engine stop control implemented by an electronic control device provided for the drive system of FIG. 1.

FIG. 12 is the flow chart for explaining a major portion of the engine stop control implemented by the electronic control device 40. The engine stop control is repeatedly implemented with a predetermined cycle time.

The engine stop control is initiated with step (hereafter, term "step" is omitted) S1 corresponding to an operation of the neutral state determining portion 70, to determine whether the presently selected operating position Ps of the manually operated shifting device is the neutral position "N" based on the detection result of the shift sensor 52. If a negative determination is obtained in S1, the present control routine is terminated. If an affirmative determination is obtained in S1, the control flow goes to S2 corresponding to an operation of the engine stop determining portion 72, to determine whether the engine 12 is required to be stopped. For example, this determination is made depending upon whether the ignition switch 53 has been brought to the "OFF" state. If a negative determination is obtained in S2, the present control routine is terminated. If an affirmative determination is obtained in S2, the control flow goes to S3 corresponding to an operation of the resonance determining portion 74, to determine whether generation of a resonance in the power transmitting system (drive line) of the hybrid vehicle provided with the drive system 10 has been detected or forecasted. If a negative determination is obtained in S3, the present control routine is terminated. If an affirmative determination is obtained in S3, the control flow goes to S4 corresponding to an operation of the drive mode determining portion 76, to determine whether the engine 12 is required to be stopped while the drive system 10 is placed in the mode 3 (HV-1). If a negative determination is obtained in S4, the control flow goes to S7. If an affirmative determination is obtained in S4, the control flow goes to S5 corresponding to an operation of the clutch engagement control portion 78, to initiate an increase of the torque capacity (engaging force) of the clutch CL. Then, the control flow goes to S6 to determine whether the clutch CL has been fully engaged (placed in the fully engaged state). If a negative determination is obtained in S6, the control flow goes back to S5. If an affirmative determination is obtained in S6, the present control routine is terminated. S7 corresponding to an operation of the brake engagement control portion 80, to initiate an increase of the torque capacity (engaging force) of the brake BK. Then, the control flow goes to S8 to determine whether the brake BK has been fully engaged (placed in the fully engaged state). If a negative determination is obtained in S8, the control flow goes back to S7. If an affirmative determination is obtained in S8, the present control routine is terminated.

Other preferred embodiments of the present invention will be described in detail by reference to the drawings. In the following description, the same reference signs will be used to identify the same elements in the different embodiments, which will not be described redundantly.

SECOND EMBODIMENT

Figure 13:
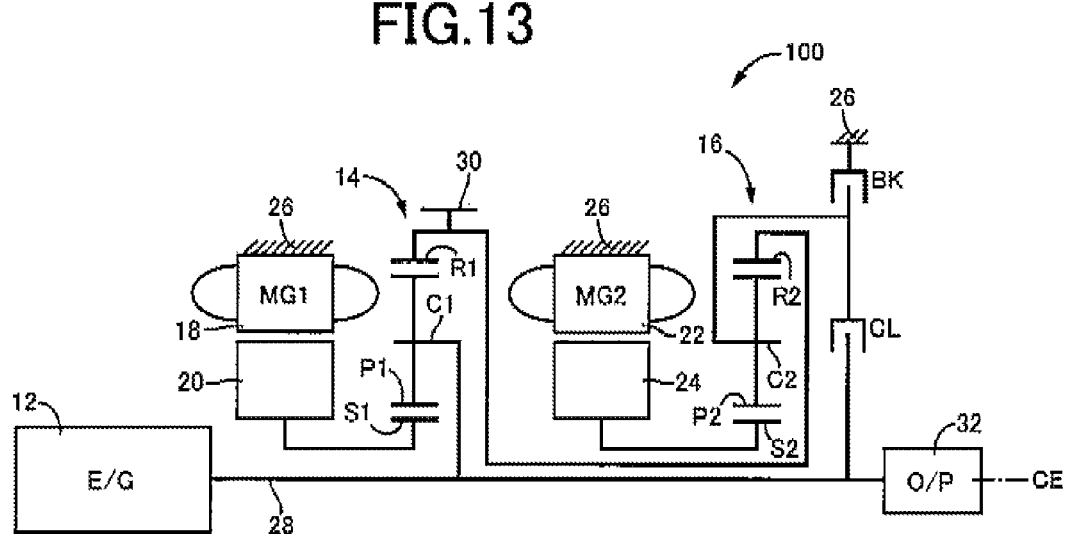
FIG. 13 is a schematic view for explaining an arrangement of a hybrid vehicle drive system according to another preferred embodiment of this invention.

FIG. 13 is the schematic view for explaining an arrangement of a hybrid vehicle drive system 100 (hereinafter referred to simply as a "drive system 100") according to another preferred embodiment of this invention. In this drive system 100 shown in FIG. 13, the second planetary gear set 16, clutch CL and brake BK are disposed on one side of the first planetary gear set 14 remote from the engine 12, such that the second electric motor MG2 is interposed between the first planetary gear set 14, and the second planetary gear set 16, clutch CL and brake BK, in the axial direction of the center axis CE. Preferably, the clutch CL and brake BK are disposed at substantially the same position in the axial direction of the center axis CE. That is, the drive system 100 is configured such that the first electric motor MG1, first planetary gear set 14, second electric motor MG2, second planetary gear set 16, clutch CL, and brake BK are disposed coaxially with each other, in the order of description from the side of the engine 12, in the axial direction of the center axis CE. The hybrid vehicle drive control device according to the present invention is equally applicable to the present drive system 100 configured as described above.

THIRD EMBODIMENT

Figure 14:
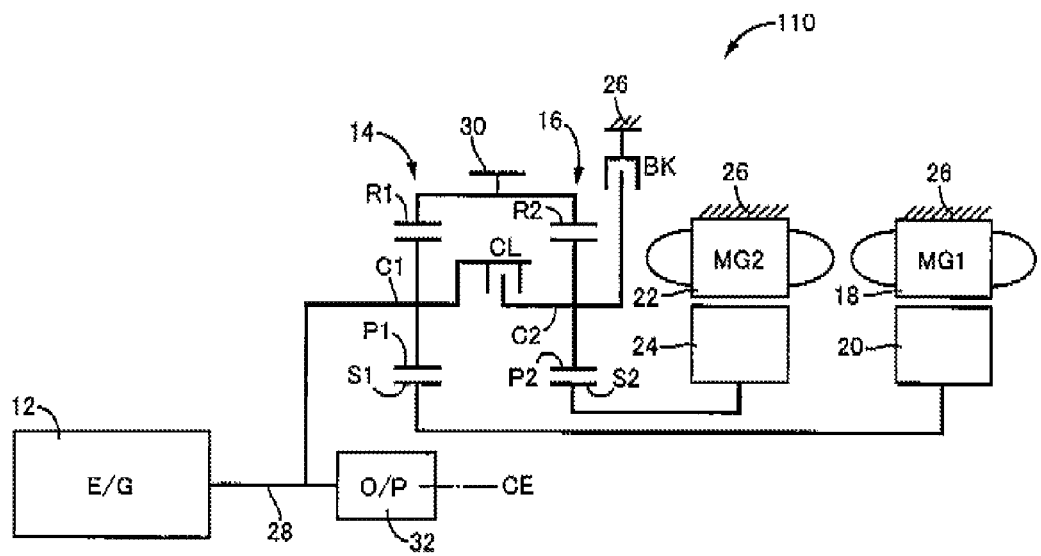
FIG. 14 is a schematic view for explaining an arrangement of a hybrid vehicle drive system according to a further preferred embodiment of this invention.

FIG. 14 is a schematic view for explaining an arrangement of a hybrid vehicle drive system 110 (hereinafter referred to simply as a "drive system 110") according to a further preferred embodiment of this invention. In this drive system 110 shown in FIG. 14, the first planetary gear set 14, clutch CL, second planetary gear set 16 and brake BK which constitute a mechanical system are disposed on the side of the engine 12, while the first electric motor MG1 and second electric motor MG2 which constitute an electric system are disposed on one side of the mechanical system remote from the engine 12.

That is, the drive system 110 is configured such that the first planetary gear set 14, clutch CL, second planetary gear set 16, brake BK, second electric motor MG2, and first electric motor MG1 are disposed coaxially with each other, in the order of description from the side of the engine 12, in the axial direction of the center axis CE. The hybrid vehicle drive control device according to the present invention is equally applicable to the present drive system 110 configured as described above.

FOURTH EMBODIMENT

Figure 15:
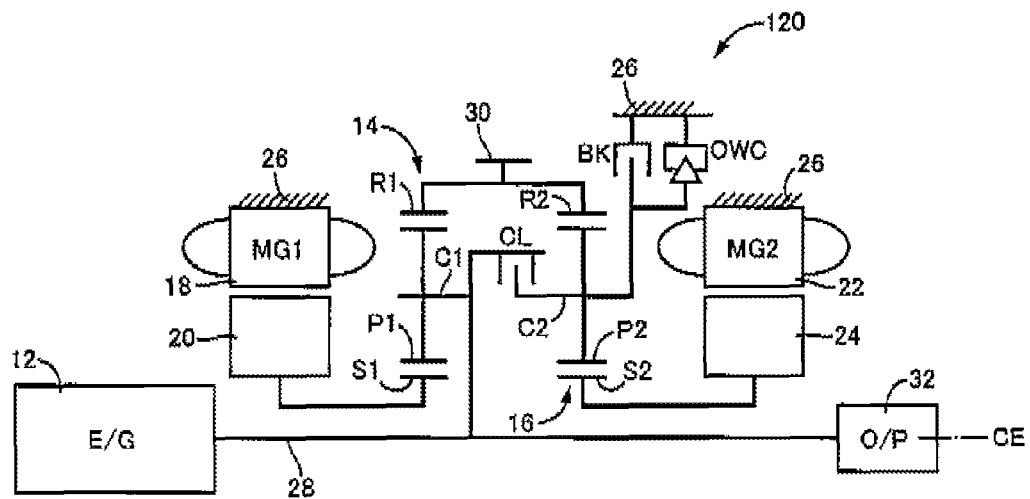
FIG. 15 is a schematic view for explaining an arrangement of a hybrid vehicle drive system according to a still further preferred embodiment of this invention.

FIG. 15 is the schematic view for explaining an arrangement of a hybrid vehicle drive system 120 (hereinafter referred to simply as a "drive system 120") according to a still further preferred embodiment of this invention. In this drive system 120 shown in FIG. 15, a one-way clutch OWC is disposed in parallel with the brake BK, between the carrier C2 of the second planetary gear set 16 and the stationary member in the form of the above-indicated housing 26. The one-way clutch OWC permits a rotary motion of the carrier C2 in one of opposite directions relative to the housing 26, and inhibits a rotary motion of the carrier C2 in the other direction. Preferably, this one-way clutch OWC permits the rotary motion of the carrier C2 in the positive or forward direction relative to the housing 26, and inhibits the rotary motion of the carrier C2 in the negative or reverse direction. Namely, in a drive state where the carrier C2 is rotated in the negative direction, that is, the second electric motor MG2 is operated to generate a negative torque, for example, the modes 1-3 can be established without the engaging action of the brake BK. The hybrid vehicle drive control device according to the present invention is equally applicable to the present drive system 120 configured as described above.

FIFTH EMBODIMENT

Figure 16:
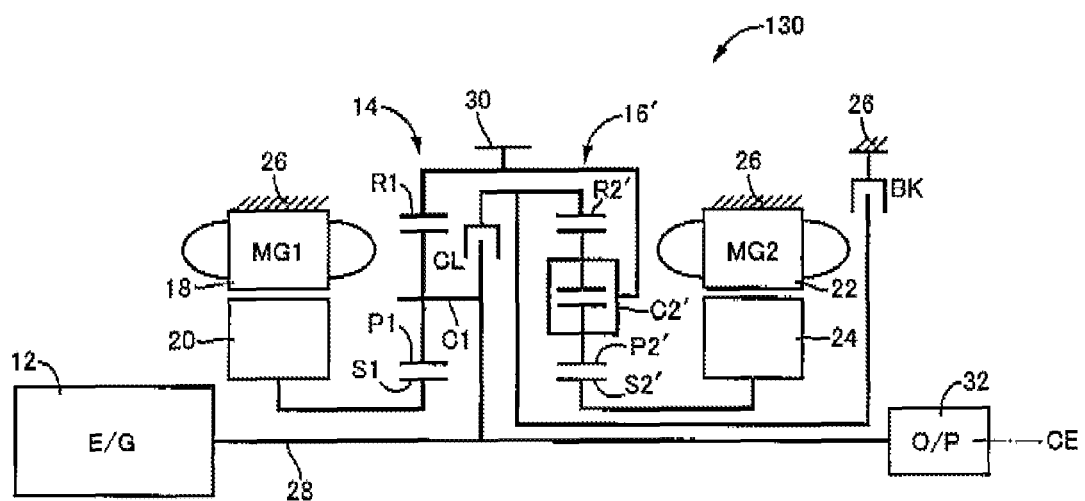
FIG. 16 is a schematic view for explaining an arrangement of a hybrid vehicle drive system according to a yet further preferred embodiment of this invention.

FIG. 16 is the schematic view for explaining an arrangement of a hybrid vehicle drive system 130 (hereinafter referred to simply as a "drive system 130") according to a yet further preferred embodiment of this invention. This drive system 130 shown in FIG. 16 is provided with a second differential mechanism in the form of a double-pinion type second planetary gear set 16' disposed on the center axis CE, in place of the single-pinion type second planetary gear set 16. This second planetary gear set 16' is provided with rotary elements (elements) consisting of; a first rotary element in the form of a sun gear S2'; a second rotary element in the form of a carrier C2' supporting a plurality of pinion gears P2' meshing each other such that each pinion gear P2' is rotatable about its axis and the axis of the planetary gear set; and a third rotary element in the form of a ring gear R2' meshing with the sun gear S2' through the pinion gears P2'.

The ring gear R1 of the first planetary gear set 14 is connected to the output rotary member in the form of the output gear 30, and to the carrier C2 of the second planetary gear set 16'. The sun gear S2' of the second planetary gear set 16' is connected to the rotor 24 of the second electric motor MG2. Between the carrier C1 of the first planetary gear set 14 and the ring gear R2' of the second planetary gear set 16', there is disposed the clutch CL which is configured to selectively couple these carrier C1 and ring gear R2' to each other (to selectively connect the carrier C1 and ring gear R2' to each other or disconnect the carrier C1 and ring gear R2' from each other). Between the ring gear R2' of the second planetary gear set 16' and the stationary member in the form of the housing 26, there is disposed the brake BK which is configured to selectively couple (fix) the ring gear R2' to the housing 26.

As shown in FIG. 16, the drive system 130 is configured such that the first planetary gear set 14 and second planetary gear set 16' are disposed coaxially with the input shaft 28, and opposed to each other in the axial direction of the center axis CE. Namely, the first planetary gear set 14 is disposed on one side of the second planetary gear set 16' on the side of the engine 12, in the axial direction of the center axis CE. The first electric motor MG1 is disposed on one side of the first planetary gear set 14 on the side of the engine 12, in the axial direction of the center axis CE. The second electric motor MG2 is disposed on one side of the second planetary gear set 16' which is remote from the engine 12, in the axial direction of the center axis CE. Namely, the first electric motor MG1 and second electric motor MG2 are opposed to each other in the axial direction of the center axis CE, such that the first planetary gear set 14 and second planetary gear set 16' are interposed between the first electric motor MG1 and second electric motor MG2. That is, the drive system 130 is configured such that the first electric motor MG1, first planetary gear set 14, clutch CL, second planetary gear set 16', second electric motor MG2, and brake BK are disposed coaxially with each other, in the order of description from the side of the engine 12, in the axial direction of the center axis CE. The hybrid vehicle drive control device according to the present invention is equally applicable to the present drive system 130 configured as described above.

SIXTH EMBODIMENT

Figure 17:
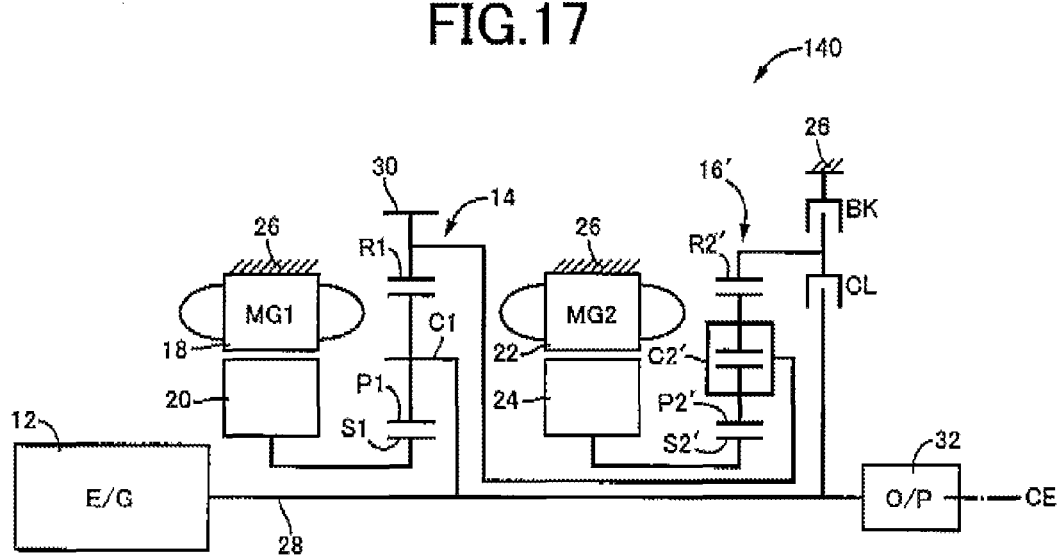
FIG. 17 is a schematic view for explaining an arrangement of a hybrid vehicle drive system according to still another preferred embodiment of this invention.

FIG. 17 is the schematic view for explaining an arrangement of a hybrid vehicle drive system 140 (hereinafter referred to simply as a "drive system 140" according to still another preferred embodiment of this invention. In this drive system 140 shown in FIG. 17, the second planetary gear set 16', clutch CL and brake BK are disposed on one side of the first planetary gear set 14 remote from the engine 12, such that the second electric motor MG2 is interposed between the first planetary gear set 14, and the second planetary gear set 16', clutch CL and brake BK, in the axial direction of the center axis CE. Preferably, the clutch CL and brake BK are disposed at substantially the same position in the axial direction of the center axis CE. That is, the drive system 140 is configured such that the first electric motor MG1, first planetary gear set 14, second electric motor MG2, second planetary gear set 16', clutch CL, and brake BK are disposed coaxially with each other, in the order of description from the side of the engine 12, in the axial direction of the center axis CE. The hybrid vehicle drive control device according to the present invention is equally applicable to the present drive system 140 configured as described above.

SEVENTH EMBODIMENT

Figure 18:
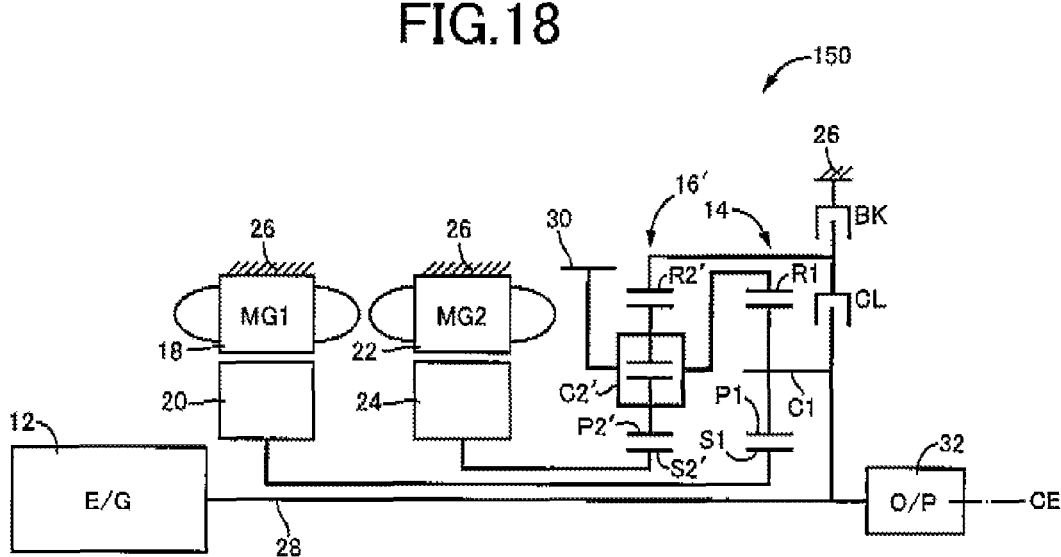
FIG. 18 is a schematic view for explaining an arrangement of a hybrid vehicle drive system according to yet another preferred embodiment of this invention.

FIG. 18 is the schematic view for explaining an arrangement of a hybrid vehicle drive system 150 (hereinafter referred to simply as a "drive system 150") according to yet another preferred embodiment of this invention. In this drive system 150 shown in FIG. 18, the first electric motor MG1 and second electric motor MG2 which constitute an electric system are disposed on the side of the engine 12, while the second planetary gear set 16', first planetary gear set 14, clutch CL, and brake BK which constitute a mechanical system are disposed on one side of the electric system remote from the engine 12. Preferably, the clutch CL and the brake BK are positioned substantially same level with regard to an axial direction of the center axis CE. That is, the drive system 150 is configured such that the first electric motor MG1, second electric motor MG2, second planetary gear set 16', first planetary gear set 14, clutch CL, and brake BK are disposed coaxially with each other, in the order of description from the side of the engine 12, in the axial direction of the center axis CE. The hybrid vehicle drive control device according to the present invention is equally applicable to the present drive system 150 configured as described above.

The present embodiment described above is provided with: the first differential mechanism in the form of the first planetary gear set 14 having the first rotary element in the form of the sun gear S1 connected to the first electric motor MG1, the second rotary element in the form of the carrier C1 connected to the engine 12, and the third rotary element in the form of the ring gear R1 connected to the output rotary member in the form of the output gear 30; the second differential mechanism in the form of the second planetary gear set 16 (16') having the first rotary element in the form of the sun gear S2 (S2') connected to the second electric motor MG2, the second rotary element in the form of the carrier C2 (C2'), and the third rotary element in the form of the ring gear R2 (R2'), one of the carrier C2 (C2') and the ring gear R2 (R2') being connected to the ring gear R1 of the first planetary gear set 14; the clutch CL configured to selectively couple the carrier C1 of the first planetary gear set 14, and the other of the carrier C2 (C2') and the ring gear R2 (R2') which is not connected to the ring gear R1, to each other; and the brake BK configured to selectively couple the other of the carrier C2 (C2') and the ring gear R2 (R2') which is not connected to the ring gear R1, to the stationary member in the form of the housing 26. The present embodiment is configured such that the torque capacity of at least one of the clutch CL and the brake BK is increased upon lowering of the operating speed $N_E$ of the engine 12. The increase of the torque capacity of the clutch CL and/or the brake BK upon lowering of the engine speed $N_E$ permits reduction of the length of time required to lower the engine speed $N_E$ to a value corresponding to the lower limit of the resonance band, making it possible to reduce the risk of generation of noises and vibrations upon lowering of the engine speed $N_E$. Namely, the electronic control device 40 acting as the drive control device for the hybrid vehicle, which is provided according to the present embodiment, permits reduction of the risk of generation of noises and vibrations upon lowering of the engine speed $N_E$.

The torque capacity of at least one of the clutch CL and the brake BK is increased when the control to stop the engine 12 is implemented in the neutral state. The increase of the torque capacity of the clutch CL and/or the brake BK permits reduction of the length of time required to lower the engine speed to the value corresponding to the lower limit of the resonance band, when the engine stop control is implemented in the neutral state, so that the risk of generation of noises and vibrations can be reduced.

While the preferred embodiments of this invention have been described by reference to the drawings, it is to be understood that the invention is not limited to the details of the illustrated embodiments, but may be embodied with various changes which may occur without departing from the spirit of the invention.

NOMENCLATURE OF REFERENCE SIGNS

10, 100, 110, 120, 130, 140, 150: Hybrid vehicle drive system
12: Engine 14: First planetary gear set (First differential mechanism)
16, 16': Second planetary gear set (Second differential mechanism)
18, 22: Stator 20, 24: Rotor 26: Housing (Stationary member)
28: Input shaft 30: Output gear (Output rotary member)
32: Oil pump 40: Electronic control device (Drive control device)
42: Accelerator pedal operation amount sensor 44: Engine speed sensor
46: MG1 speed sensor 48: MG2 speed sensor 50: Output speed sensor
52: Shift position sensor 53: Ignition switch 54: Battery SOC sensor
56: Engine control device 58: Inverter 60: Hydraulic control unit
70: Neutral state determining portion 72: Engine stop determining portion
74: Resonance determining portion
76: Drive mode determining portion 78: Clutch engagement control portion
80: Brake engagement control portion BK: Brake CL: Clutch
C1, C2, C2': Carrier (Second rotary element) MG1: First electric motor
MG2: Second electric motor OWC: One-way clutch
P1, P2, P2': Pinion gear R1, R2, R2': Ring gear (Third rotary element)
S1, S2, S2': Sun gear (First rotary element)

The invention claimed is:

1. A drive control device for a hybrid vehicle provided with: a first differential mechanism having a first rotary element connected to a first electric motor, a second rotary element connected to an engine, and a third rotary element connected to an output rotary member; a second differential mechanism having a first rotary element connected to a second electric motor, a second rotary element, and a third rotary element, one of the second rotary element and the third rotary element being connected to the third rotary element of said first differential mechanism; a clutch configured to selectively couple the second rotary element of said first differential mechanism, and the other of the second and third rotary elements of said second differential mechanism which is not connected to the third rotary element of said first differential mechanism, to each other; and a brake configured to selectively couple said other of the second and third rotary elements of said second differential mechanism which is not connected to the third rotary element of said first differential mechanism, to a stationary member, the drive control device comprising:

a torque capacity control portion configured to increase torque capacities of both of said clutch and said brake upon lowering of an operating speed of said engine when a control to stop said engine is implemented while the hybrid vehicle is placed in a neutral state.

2. A drive control device for a hybrid vehicle, provided with: a first differential mechanism having a first rotary element, a second rotary element and a third rotary element; and a second differential mechanism having a first rotary element, a second rotary element and a third rotary element, the drive control device being characterized in that:

a first electric motor is connected to the first rotary element of said first differential mechanism, while an engine is connected to the second rotary element of said first differential mechanism;

a second electric motor is connected to one of the first rotary element and the third rotary element of said second differential mechanism, while an output rotary member is connected to the other of the first and third rotary elements of said second differential mechanism;

a clutch is provided to connect and disconnect the second rotary element of said first differential mechanism and the second rotary element of said second differential mechanism to and from each other;

the third rotary element of said first differential mechanism is connected to the first rotary element or the third rotary element of said second differential mechanism;

a brake is provided to connect and disconnect the second rotary element of said second differential mechanism and a stationary member to and from each other; and a torque capacity control portion is provided to increase torque capacities of both of said clutch and said brake upon lowering of an operating speed of said engine when a control to stop said engine is implemented while the hybrid vehicle is placed in a neutral state.

3. The drive control device according to claim 1, wherein said first electric motor and said second electric motor are placed in a shut-down state, while the hybrid vehicle is placed in said neutral state.

4. The drive control device according to claim 1, wherein said clutch is given a torque capacity when the control to stop said engine is implemented in the neutral state, even while it is determined that the hybrid vehicle is placed in a drive mode in which said clutch is placed in a released state while said brake is placed in an engaged state.

* * * * *